United States Patent Office 3,466,598
Patented Sept. 9, 1969

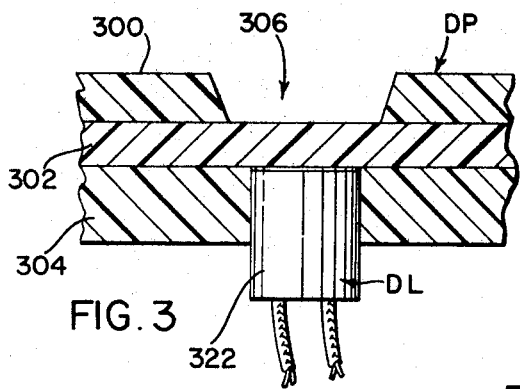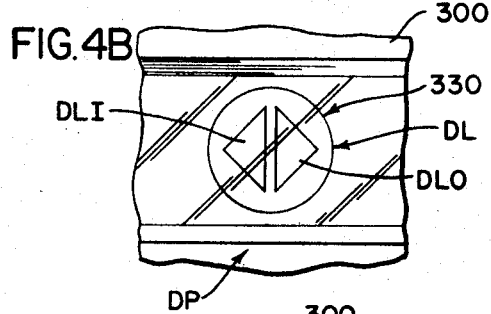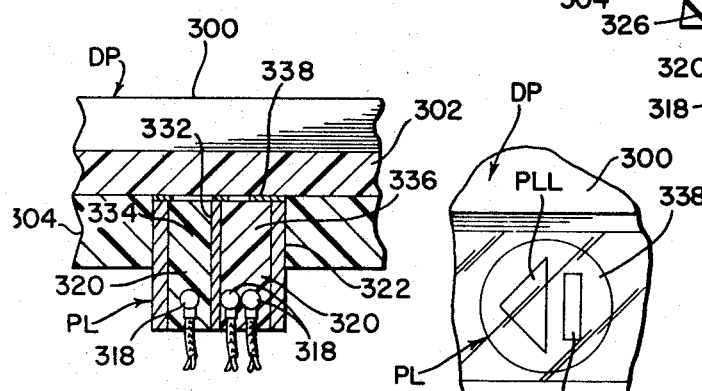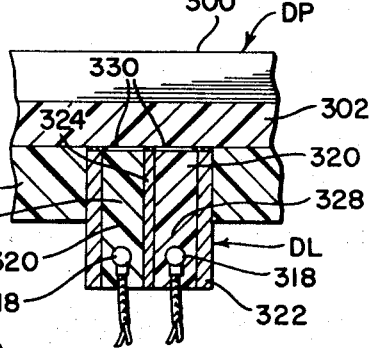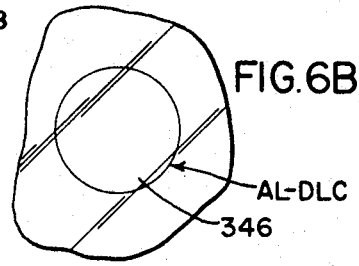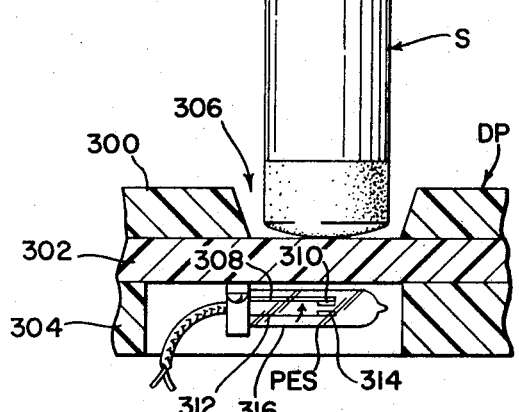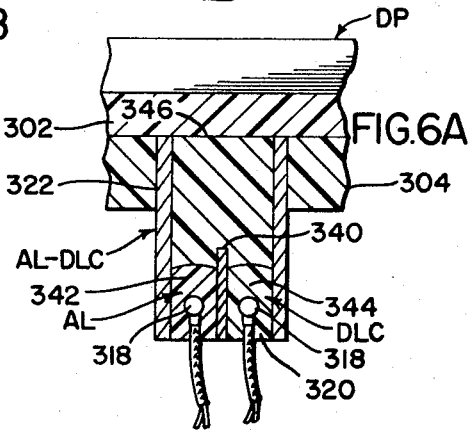

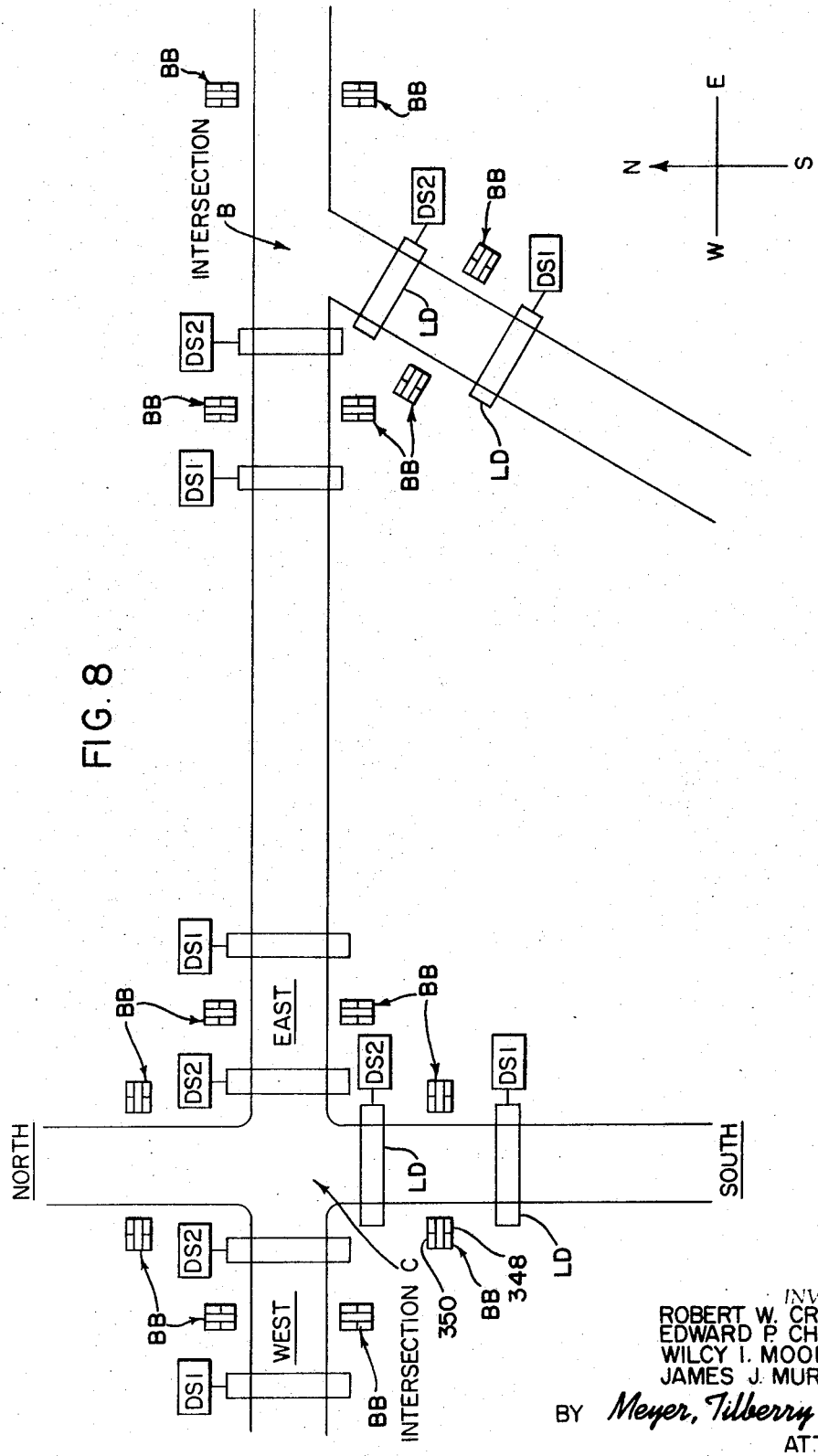

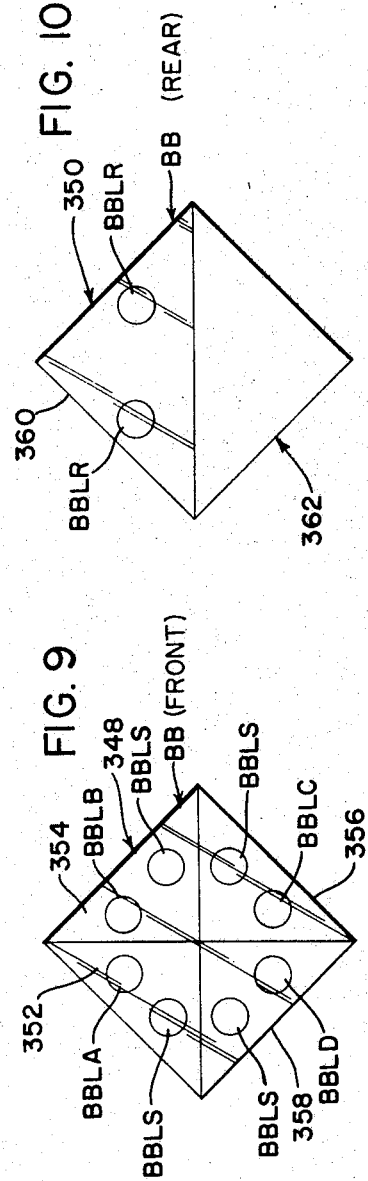
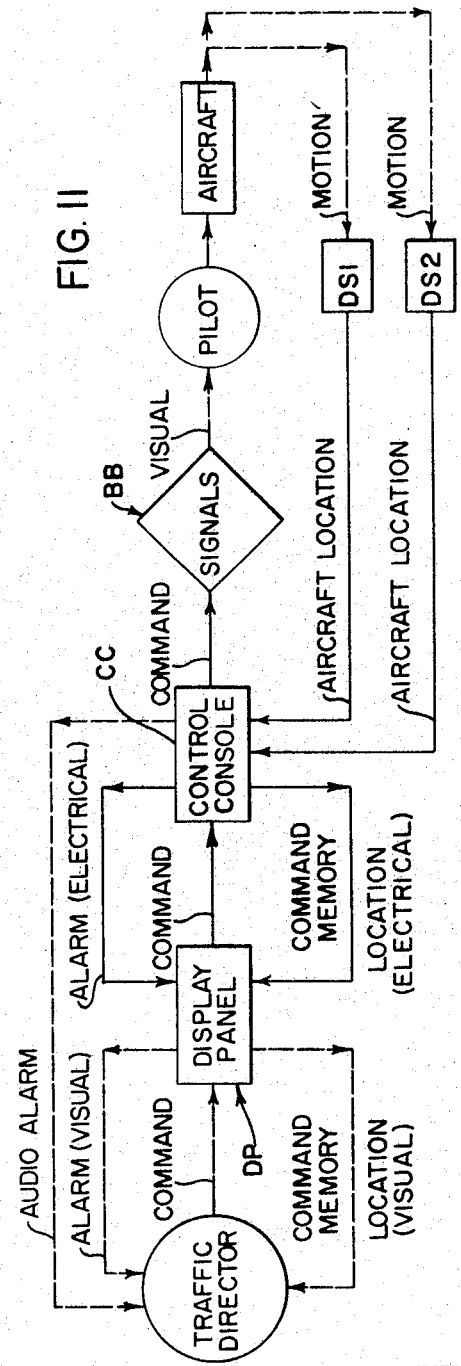

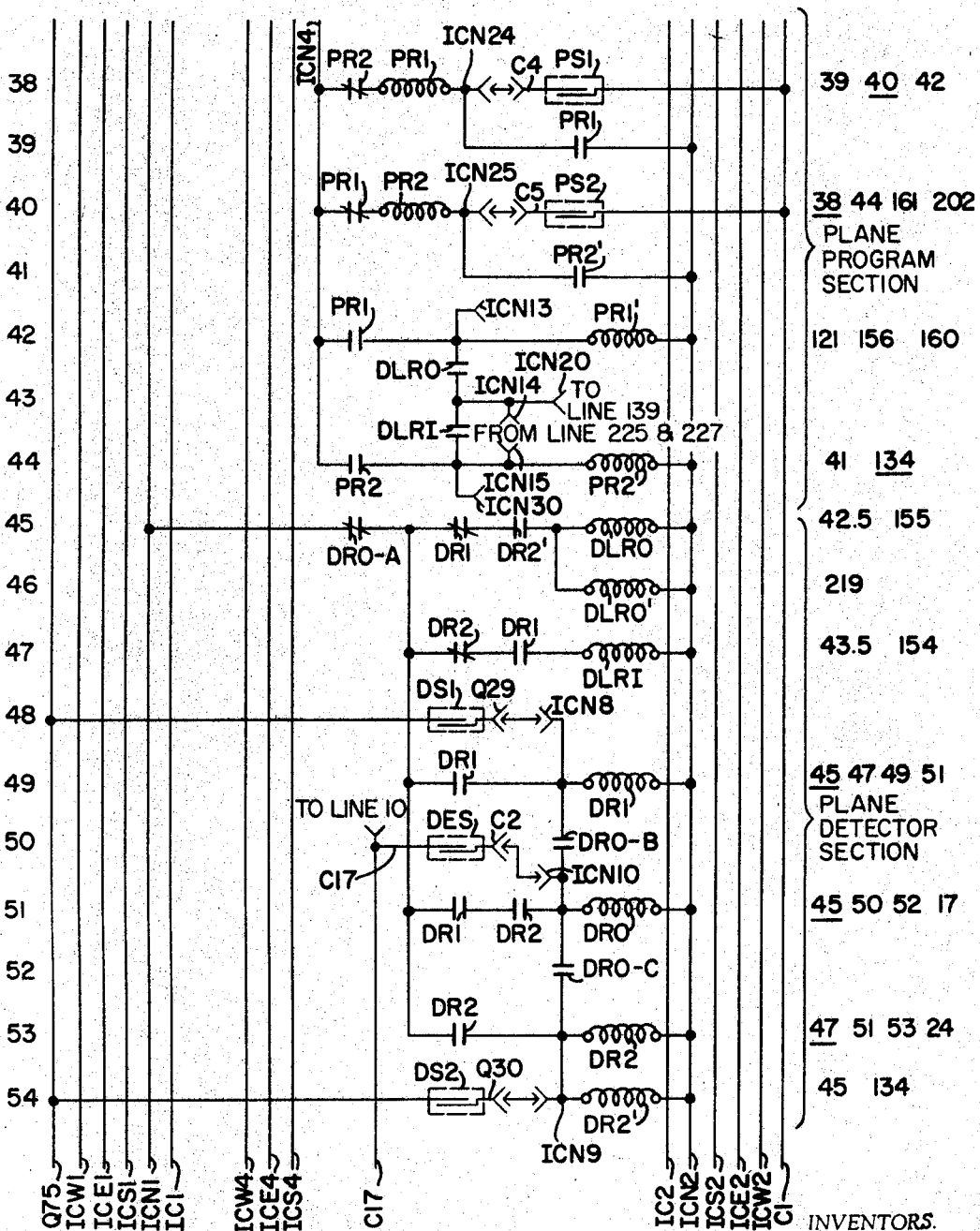

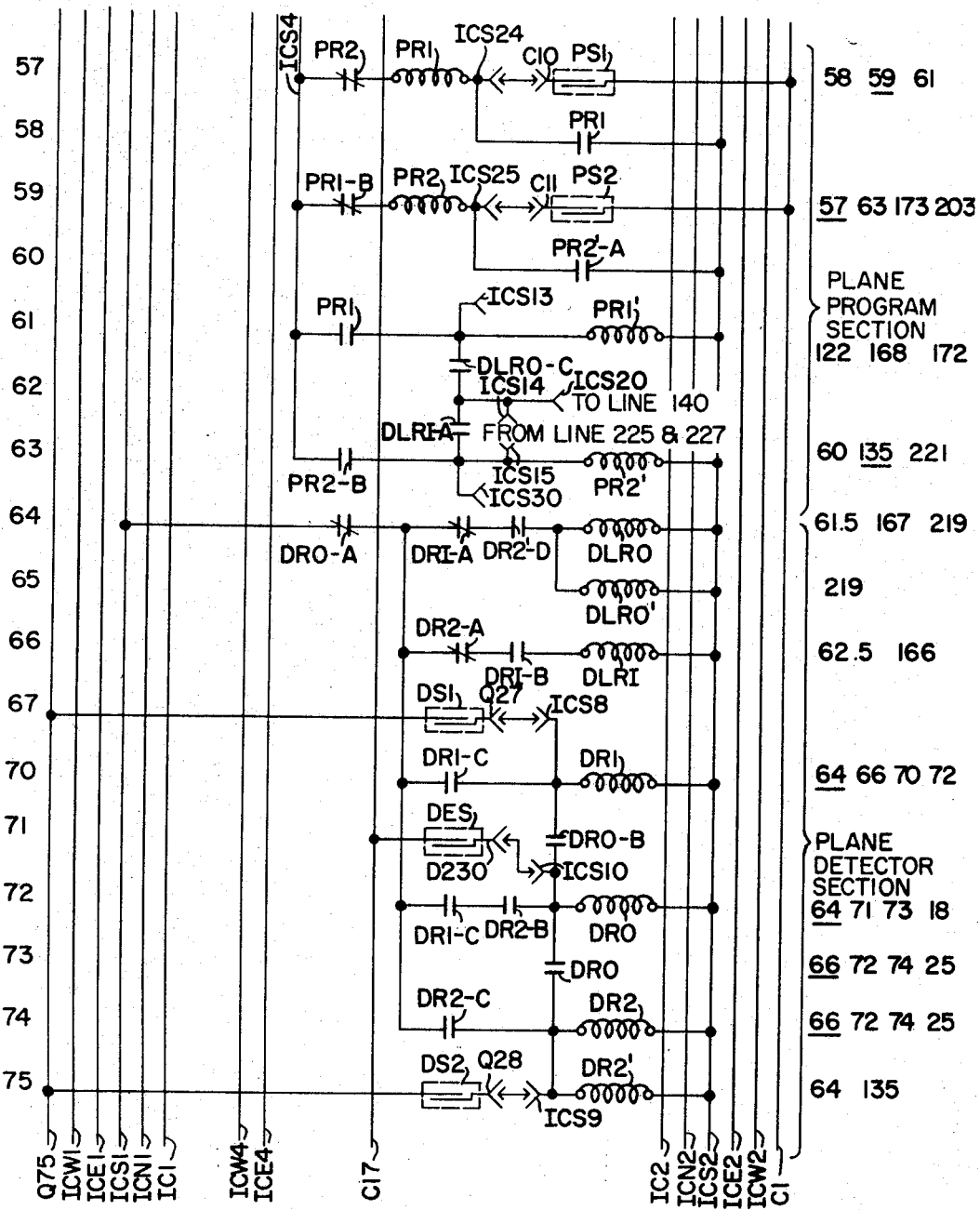

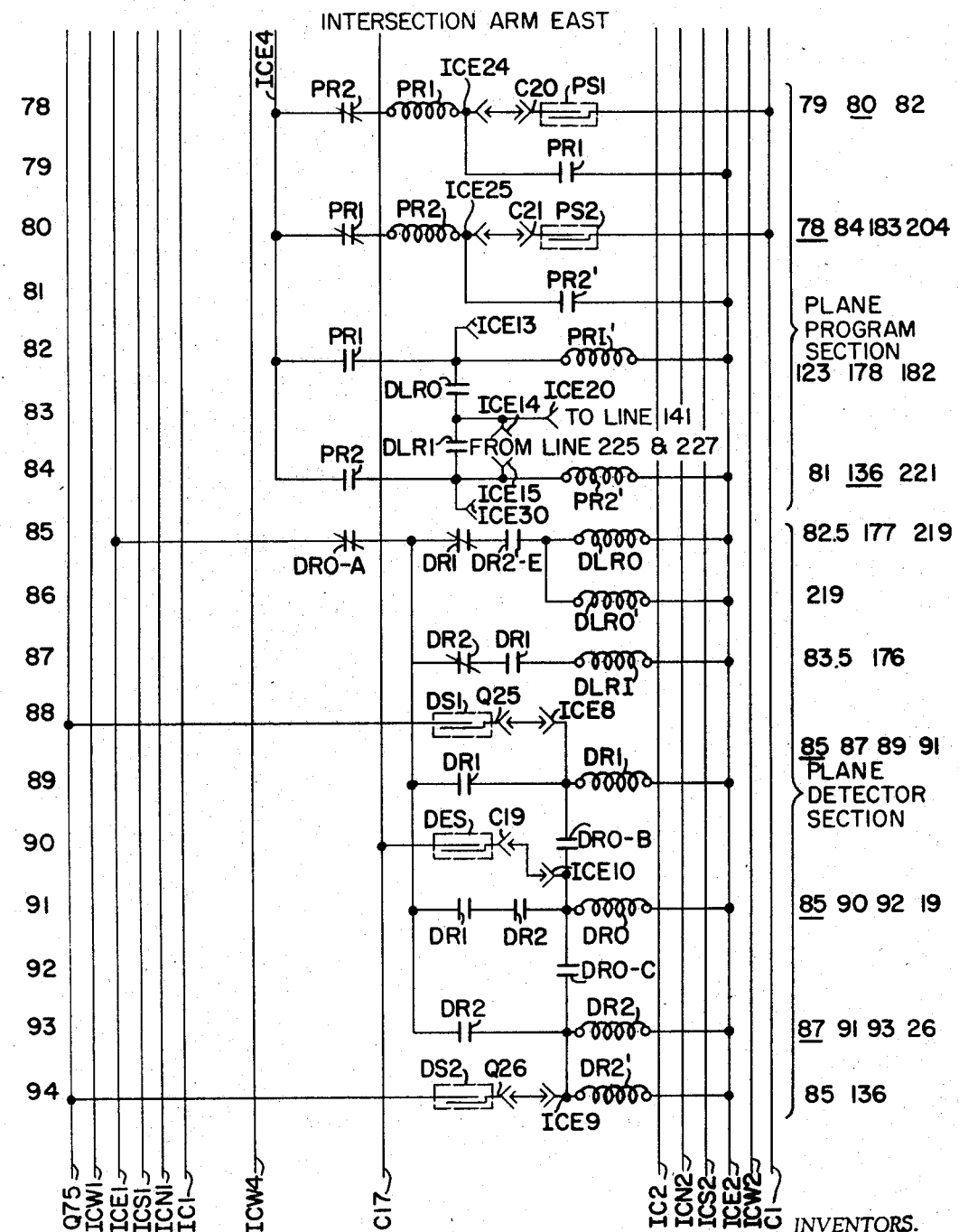

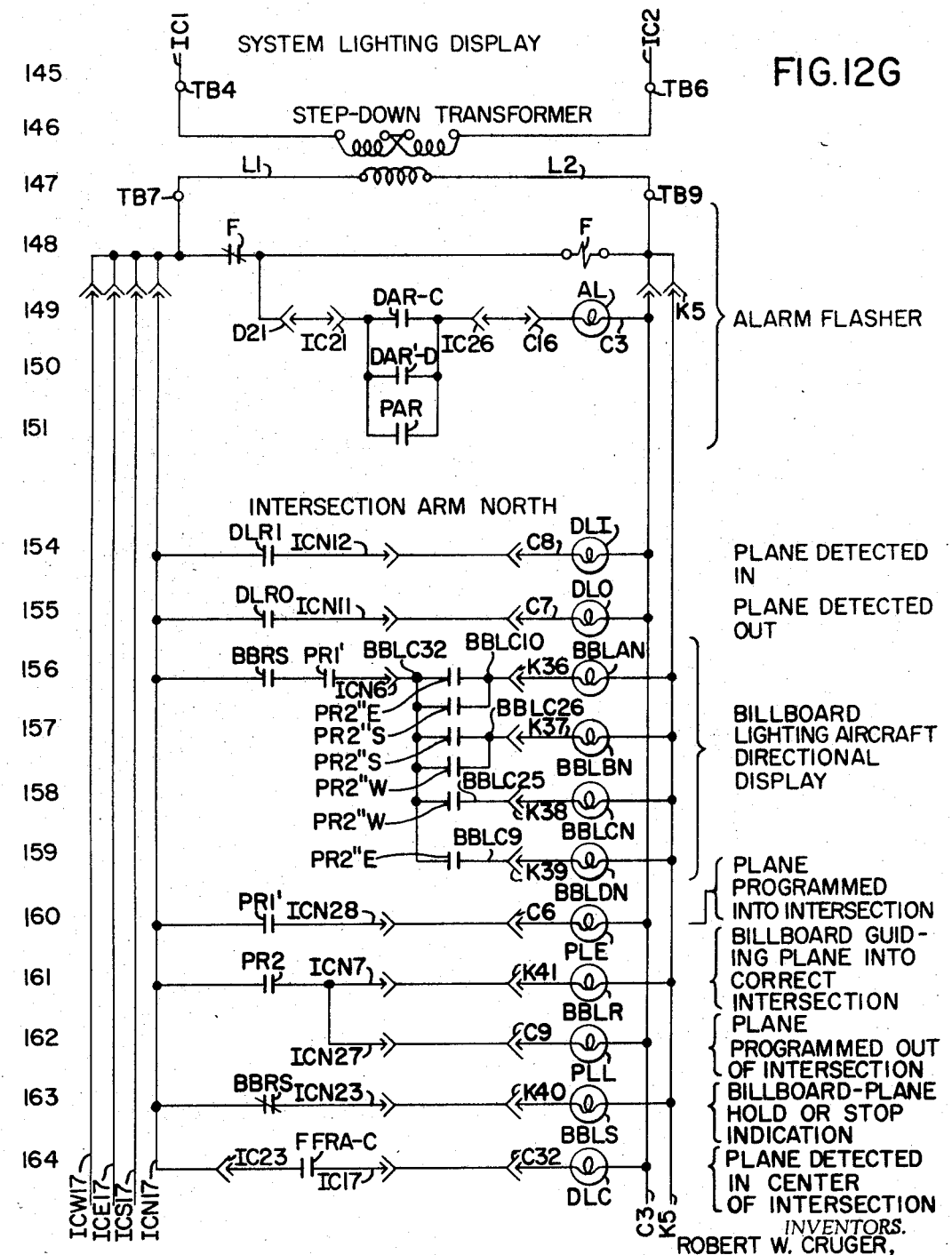

1

3,466,598
APPARATUS FOR PROGRAMMING TRAFFIC
FLOW PATH ROUTES
Robert W. Cruger, Springfield, Edward P. Cheslock,
Newton Square, Wilcy I. Moore, Folsom, and James J.
Murray, Havertown, Pa., assignors to E. W. Bliss Company, Canton, Ohio, a corporation of Delaware
Continuation of application Ser. No. 551,679, May 20,
1966. This application July 15, 1966, Ser. No. 565,462
Int. Cl. G08g 1/12, 1/07
U.S. Cl. 340—23                     27 Claims This is a continuing application of our application, Serial No. 551,679, filed May 20, 1966, now abandoned.

This invention pertains to the art of flow control and, more particularly, to rapid programming of a desired route to be followed by movable means, such as an aircraft, through a network of intersecting flow paths, such as an airport's taxway and runway intersection network.

The invention is particularly applicable for directing aircraft ground traffic through an airport's network of intersecting runways and taxiways and will be described with particular reference thereto; although, it will be appreciated that the invention has broader aspects and may, for example, be used for directing automobiles through a network of intersecting automobile roadways.

Present day airports are frequently required to accommodate increasingly large volumes of aircraft traffic. Many airports include more than one runway and many taxiways leading from the airport's terminal facilities to each runway. Frequently the runways and taxiways intersect, posing ground traffic control problems in directing aircraft safely through the intersections, particularly when large volumes of aircraft traffic are being accommodated.

It is common practice at many airports to control aircraft ground traffic by means of radio communications between an airport ground traffic director at the airport's control tower and the aircraft pilots. The volume of radio communication between the aircraft and the control tower is limited, since the radio communication is normally over a single radio frequency channel, whereby only one aircraft pilot can maintain communication with the ground traffic director at any one time. Thus, the radio channel quickly becomes saturated as traffic volume increases, limiting the volume of aircraft ground traffic that can be safely routed through the airport's network of intersecting runways and taxiways. During adverse weather conditions, such as hours of darkness and fog, there is a greater volume of radio communications between aircraft and the control tower for taxi and takeoff instructions, further limiting the volume of aircraft ground traffic that can be safely routed. Accordingly, ground traffic instructions must be communicated to aircraft pilots by means other than radio if airports are to accommodate increasingly larger volumes of aircaft traffic.

Systems have been proposed for displaying aircraft movement and directional command signals to aircraft pilots by means of signal lights located adjacent to runway and taxiway intersections for directing aircraft to follow programmed routes. Such visual command systems are controlled by a traffic director, at the control tower, who mechanically actuates selected push buttons and switches, which in turn energize the appropriate signal lights to display movement and direction visual command signals to an aircraft pilot. For a large airport having many complex runway and taxiway intersections, the required number of such mechanically actuated switches and push buttons would render such a system

2 extremely complex and, hence, difficult to operate, resulting in a high chance for human programming error. Further, the programming time required for an operator to mentally determine the desired route and then select and actuate the required combination of push buttons and switches would be extensive for a complex runway and taxiway intersection network.

The foregoing disadvantages, and others, of previous radio and visual ground traffic control communication systems have been overcome by the present invention wherein the ground traffic control director merely traces, by means of a stylus, a desired route on a graphical illustration of the runway and taxiway intersection network in order to communicate visual command signals to an aircraft pilot. The time required to enter a programmed route with the stylus is less than that required to communicate the same information by such previous radio or visual systems, and is more reliable than such systems as chances for human error are substantially eliminated.

In accordance with the present invention the system includes: a display panel graphically illustrating an actual flow path intersection network, such as an airport's runway and taxiway intersection network; an operator's manually movable stylus for tracing a programmed route on the panel's illustrated network, the programmed route being representative of the desired route to be followed by a movable means, such as an aircraft, through the actual network; stylus actuated means associated with the panel's illustrated network; and, control means responsive to actuations of the stylus actuated means for controlling energization of intersection routing means, such as traffic signal lights, associated with the actual network for routing the movable means through the actual network in accordance with the programmed route.

Further in accordance with the present invention, the stylus takes the form of a magnet and the stylus actuated means takes the form of magnetic reed switches individually actuated by the magnetic field of the magnet as the magnet traces the programmed route.

In accordance with a more limited aspect of the invention, the system further includes: a panel illustration of at least one actual roadway intersection and two intersection arms extending from the intersection; at least two stylus actuated switches associated with each arm; and, a program control circuit which is responsive to the sequence of actuation of the swtiches for controlling energization of the intersection traffic signal lights for displaying visual command signals to vehicles.

In accordance with a still further aspect of the invention, the panel's roadway intersection network is defined by a groove in the panel's face, so that the groove serves as a guide to facilitate tracing movement of the stylus when a program is being entered.

Still further in accordance with the invention, a program erase switch is provided for erasing a previously entered program, if the erase switch is actuated after the termination of a predetermined timed interval from the entry of the previous program.

In accordance with a still further aspect of the invention, the display panel includes memory means, such as lamps, for displaying representations of an entered programmed route to the operator.

In accordance with a still further aspect of the invention, the display panel includes vehicle location and direction indicating means, such as lamps, for displaying to an operator the locations and directions of movement of vehicles on the actual network.

Still further in accordance with the invention, the display panel includes alarm indicating means, visual and/ or audible, for alerting the operator as to alarm conditions, such as erroneous programming of conflicting routes, or programming a route which conflicts with the existing movement of a vehicle through the network, or if a vehicle disobeys programmed command signals.

The primary object of the present invention is to provide means for facilitating airport ground traffic control.

Another object of the present invention is to minimize the volume of radio communication between an airport's control tower and aircraft ground traffic, while increasing the airport's capacity to accommodate increasingly greater volumes of aircraft traffic.

A still further object of the present invention is to provide a ground traffic director with easily operable means for rapidly displaying visual command signals to an aircraft's pilot.

A still further object of the invention is to provide a ground traffic director with means for communicating visual ground traffic command signals to an aircraft pilot in less time than that required by radio communications.

A still further object of the invention is to provide a ground traffic director with means for displaying visual command signals to an aircraft pilot in less time and with greater reliability than with previously known visual display systems.

The foregoing and other objects and advantages of the invention will become apparent from the following description of the preferred embodiment of the invention as read in connection with the accompanying drawings, in which:

FIGURE 3 is a sectional view of the display panel taken along line 3—3 in FIGURE 2 looking in the direction of the arrows;

FIGURE 4A is a sectional view of a detector light module;

FIGURE 4B is a plan view of the detector light module illustrated in FIGURE 4A;

FIGURE 5A is a sectional view of a program light module;

FIGURE 5B is a plan view of the program light module illustrated in FIGURE 5A;

FIGURE 6A is a sectional view of an alarm-intersection light module;

FIGURE 6B is a plan view of the alarm-intersection light module illustrated in FIGURE 6A;

FIGURE 7 is a sectional view of the display panel taken along line 7—7 in FIGURE 2 looking in the direction of the arrows;

FIGURE 8 is an illustration of an airport's actual runway and taxiway intersection network;

FIGURE 9 is a front eelvational view of an intersection traffic signal;

FIGURE 10 is a rear elevational view of the traffic signal illustrated in FIGURE 9;

FIGURE 11 is a funcional block diagram; and

Figure 1:
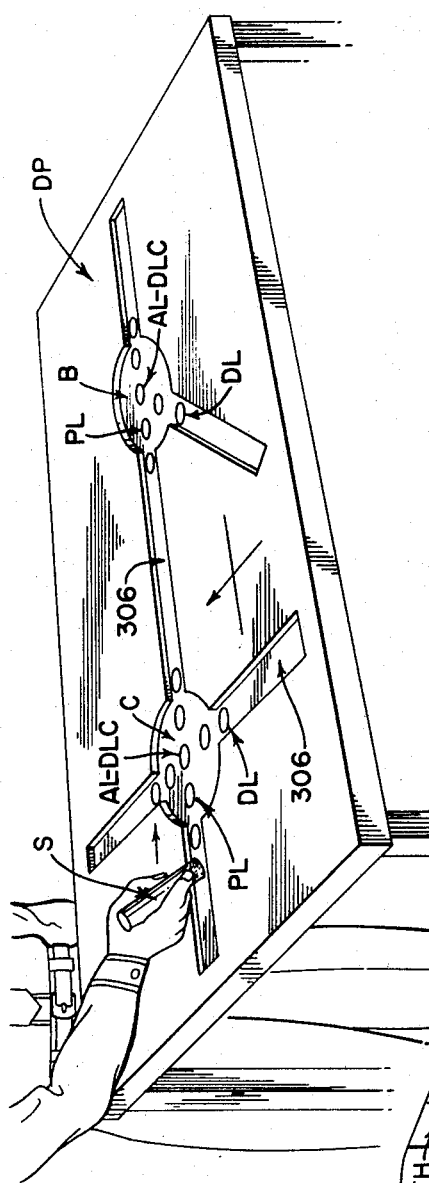
FIGURE 1 is a perspective view illustrating a display panel constructed in accordance with the invention.

Referring now to the drawings, wherein the showings are for the purpose of illustrating a preferred embodiment of the invention and not for purposes of limiting same, FIGURE 1, illustrates a display panel DP having a graphical representation on the panel face of an airport's runway and taxiway intersection network, and a magnetic stylus S which, as will be described in greater detail hereinafter, is used by a traffic director for tracing a programmed route on the display panel's network. The programmed route is representative of a desired route to be followed by an aircraft through the airport's actual runway and taxiway intersection network, illustrated in FIGURE 8.

DISPLAY PANEL

Figure 2:
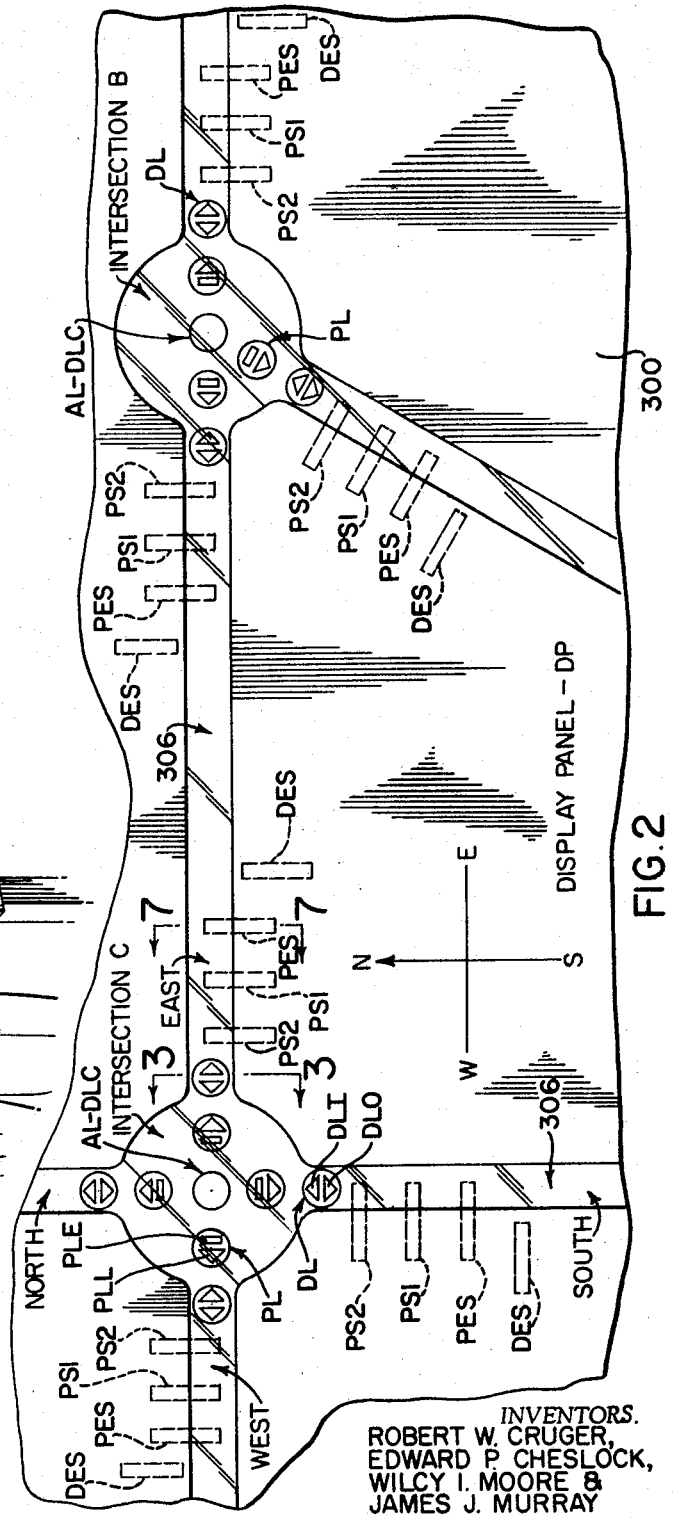
FIGURE 2 is a plan view illustrating the face of the display panel.

The display panel DP graphically illustrates the airport's actual taxiway and runway intersection network, including two typical intersections B and C, located as shown in FIGURE 2 with respect to north, south, west and east directions. Each intersection has a plurality of intersection arms extending outwardly from the intersection. Intersection C has north, south, east and west intersection arms and intersection B has a west intersection arm interconnecting with the east intersection arm of intersection C, an east intersection arm and a southwest intersection arm. These intersections and intersection arms correspond with the actual intersections and intersection arms shown in FIGURE 8.

An aircraft detector light module DL for each intersection arm is located in the panel arm adjacent a panel intersection. As will be described in greater detail hereinafter with respect to FIGURES 4A and 4B, each aircraft detector light module DL includes two portions, detector light in DLI and detector light out DLO. Detector light in DLI serves, when energized, to indicate to the traffic director that an aircraft has been detected on the actual intersection arm (FIGURE 8) and is heading toward the intersection. Similarly, detector light out DLO represents, when energized, that an aircraft has been detected on the actual intersection arm (FIGURE 8) and is heading away from the intersection.

A program light module PL is associated with each intersection arm and located in the panel intersection adjacent its associated arm. As will be described in greater detail hereinafter with respect to FIGURES 5A and 5B, each program light PL includes two portions, a program light enter portion PLE and a program light leave portion PLL. Program light portion PLE serves, when energized, to visually remind the traffic director that a program has been entered for a vehicle to enter the actual intersection from the associated intersection arm. Similarly, program light portion PLL serves, when energized, to visually remind the traffic director that a program has been entered for an aircraft to leave the actual intersection and proceed into the associated intersection arm.

At the center of each panel intersection there is provided a composite alarm-intersection light module AL-DLC, described in greater detail hereinafter with reference to FIGURES 6A and 6B. The intersection light DLC serves, when energized, to visually indicate to the traffic director that the actual intersection, see FIGURE 8, is occupied by an aircraft. The alarm light AL serves, when energized, to alert the traffic director by flashing on and off that an alarm condition exists, as will be discussed in greater detail hereinafter.

Each panel intersection arm is provided with two magnetic reed program switches PS1 and PS2, with the former being spaced further from the associated intersection than the latter, as illustrated in FIGURE 2. In addition, each panel intersection arm includes a magnetic reed program erase switch PES located at a point spaced further from the associated intersection than switch PS1. Spaced still further from the intersection than switch PES, and located at a point spaced transversely from the intersection arm, there is provided a magnetic reed detector erase switch DES.

As illustrated in FIGURES 3 and 7, the display panel DP preferably takes the form in cross-section of three sandwiched plastic sheets, including a top sheet 300, an intermediate sheet 302 and a bottom sheet 304. The top sheet 300 is preferably sandblasted and opaque and has a cut out portion defining a groove 306. The groove 306, in turn, defines the panel's runway and taxiway intersection network, as is best shown in FIGURE 2. As shown in FIGURE 7, groove 306 also serves as a guide for the passage of the magnetic stylus S as the traffic director traces the stylus through the panel's runway and taxiway intersection network. Groove 306 is particularly advantageous for facilitating movement of the stylus S when tracing turn routes, for example, a turn route from the west arm to the south arm of intersection C, illustrated in FIGURE 2, as opposed to tracing a straight ahead route.

The program light module PL, detector light module DL and magnetic reed switches PS1, PS2, PES and DES for each intersection arm are preferably mounted on a printed circuit board and secured in corresponding cut out portions to bottom sheet 304 so that the modules are located directly beneath groove 306, and that the magnetic reed switches PS1, PS2 and PES are located directly beneath groove 306 and positioned as indicated in FIGURES 2 and 7. The detector erase switch DES is also located beneath sheet 302 but is spaced transversely away from groove 306, as illustrated in FIGURE 2. Each composite alarm-intersection light module AL–DLC is also mounted beneath sheet 302 directly beneath the center of a panel intersection, as illustrated in FIGURE 2.

The intermediate sheet 302 is translucent so that light from light modules PL, DL and composite light module AL–DLC may be transmitted upwardly through the sheet. Preferably, sheet 302 exhibits a light transmission characteristic on the order of 70% to permit observation of light from the light modules, while prohibiting observation of the magnetic reed switches PES, PS1 and PS2.

Whereas in accordance with the preferred embodiment of the invention there is provided a magnetic stylus S and stylus actuated magnetic reed switches PES, PS1, PS2 and DES, the invention is not limited to same. Thus, for example, the stylus may be nonmagnetic and the switches may be pressure sensitive, heat sensitive, light sensitive, capacitive sensitive or sound sensitive. The magnetic reed switches PES, PS1, PS2 and DES may take the form such as that illustrated in FIGURE 7, wherein switch PES is shown as normally open switch having a stationary contact arm 308 carrying an electrical contact 310 at a free end thereof and a movable contact arm 312 carrying an electrical contact 314 of magnetic material at a free end thereof. Contact arm 312 is resiliently biased so that contact 314 is normally spaced both mechanically and electrically from contact 310. The contacts are enclosed by a glass envelope 316, to protect the contacts from damage and dust conditions. Envelope 316 is mounted so that contacts 310 and 314 are located directly beneath groove 306 with contact 310 being located closer to sheet 302 than is contact 314. In this manner, as stylus S traces a programmed route thorugh groove 306 the magnetic field of the stylus attracts the magnetic material of contact 314, so that contact 314 mechanically and electrically engages contact 310, closing switch PES. Magnetic reed switches PS1 and PS2 are mounted in the same manner as is switch PES. Detector erase switch DES, however, is mounted at a point spaced transversely away from groove 306, as shown in FIGURE 2, so that it is not actuated by a stylus S tracing a programmed route through groove 306. Instead, switch DES must be actuated by removing the stylus from groove 306 and placing the stylus on the top surface of sheet 300 immediately above switch DES, for purposes as will be explained in greater detail hereinafter.

The magnetic switches are preferably mounted as close together as possible to reduce the size of the display panel, but the switches must be spaced apart by a sufficient distance that only one switch is actuated by stylus S at any one time. If desired, the magnetic reed siwtches may be mounted in a vertical plane, as opopsed to the horizontal plane illustrated in FIGURE 7, to further reduce the size of the display panel.

LIGHT MODULES

Referring now to FIGURES 4A, 4B, 5A, 5B, 6A and 6B, there is illustrated the constructional details of the light modules illustrated in FIGURE 2. These light modules are described and claimed in Edward P. Cheslock's United States patent application Serial No. 551,308, filed May 19, 1966, now Patent No. 3,419,713, assigned to the same assignee of the present invention.

Each light module includes two or three miniature, low voltage electric light bulbs 318, preferably embdeded in a dyed, high temperature, resistant polyester 320 and encapsulated by an aluminum sleeve 322. The aluminum sleeve acts as a heat sink to dissipate heat generated by the bulbs.

Each detector light module DL, FIGURES 4A and 4B, includes a divider 324 extending for a length equal to that of sleeve 322 and separating the sleeve into two compartments 326 and 328, each filled with polyester 320. The polyester 320 in compartments 326 and 328 is preferably dyed yellow so that a yellow signal light is transmitted through the polyester when bulbs 318 are energized. The upper surface 330 of detector light module DL is roughened for a diffusing effect and masked to provide two signal light portions DLI and DLO, each having a distinct direction configuration in the form of a triangular shaped arrowhead as shown in FIGURE 4B. Light portions DLI and DLO are oriented back to back so that the point, i.e., the 90° apex, of each arrowhead points in an opposite direction from that of the other arrowhead.

Each program light module PL, FIGURES 5A and 5B, includes a divider 332 extending for a length equal to that of sleeve 322 and separating the sleeve into two compartments 334 and 336, each filled with polyester 320. Polyester 320 in compartments 334 and 336 is preferably dyed green so that a green signal light is transmitted through the polyester when bulbs 318 are energized. The upper surface 338 of program light module PL is roughened for a diffusing effect and masked to provide two signal light portions PLL and PLI, each having a distinct configuration. As shown in FIGURE 5B, light portion PLL has an arrowhead configuration similar to that of light portions DLI and DLO, illustrated in FIGURE 4B, and light portion PLE has a rectangular bar-like configuration forming a tail for the arrowhead light portion PLL.

Each alarm-intersection light module AL–DLC, FIGURES 6A and 6B, is constructed similar to the detector and program light modules, but includes a short divider 340 which does not extend for the length of sleeve 322. Divider 340 defines two short compartments 342 and 344, which in turn respectively define alarm light portion AL and intersection light portion DLC. Compartment 342 is filled with red dyed polyester and compartment 344 is filled with yellow dyed polyester, and the remaining portion of the sleeve is filled with clear, diffusing polyester. The top surface 346 of the module is abraded or roughened, but is not masked as in the case of the detector and program light modules, so as to provide a circular configuration, as shown in FIGURE 6B. With this construction, light transmitted from bulbs 318 in the alarm light portion AL and intersection light portion DLC may be tinted by the dyed polyester in compartments 342 and 344 and then be diffused through the clear polyester and displayed over the entire abraded surface 346 of the light module.

AIRCRAFT DETECTORS

Referring now to FIGURE 8, there is schematically illustrated the actual runway and taxiway intersection network, which is graphically represented on the display panel DP illustrated in FIGURES 1 and 2, and, accordingup, like character references and like legend are used in FIGURE 8 for identifying like intersections and like intersection arms. Aircraft detectors LD are provided for detecting the presence of aircraft in each intersection arm. Preferably, detectors LD take the form of loop detectors which normally comprise a loop, or loops, of current carrying conductors buried below a roadway surface. The loop configuration of each loop detector LD defines a detection area so that as a vehicle, such as an aircraft, enters the detection area, an electrical disturbance occurs in the loop conductor. This disturbance is utilized to close a set of relay contacts which remain closed so long as a vehicle is in the detection area. The invention, however, is not limited to the use of loop detectors. Preferably, however, the detectors take the form of area sensitive presence detectors, such as loop detectors or ultrasonic detectors, but may take other forms, such as spot detectors in the form of treadle pads.

As illustrated in FIGURE 8, two loop detectors LD are provided for each intersection arm, with one loop detector being located at a first detector station DS1 and a second loop detector located at a second detector station DS2. Preferably, detector station DS2 is located adjacent an intersection. Detector station DS1 is spaced further from the intersection than is station DS2 so that as an aircraft approaches an intersection it is first detected at station DS1 and then at station DS2. A pair of aircraft traffic signals BB are located on opposite sides of each intersection arm. Preferably, as illustrated in FIGURE 8, signals BB are located with respect to detector stations DS1 and DS2 so that the signals for an intersection arm are visible to a pilot in an aircraft located at station DS1 but not visible to the pilot when the aircraft reaches station DS2.

AIRCRAFT TRAFFIC SIGNALS

The aircraft traffic signals BB, shown best in FIGURES 9 and 10, are described and claimed in Edward P. Cheslock's United States patent application, Serial No. 551,260, filed May 19, 1966, assigned to the same assignee as the present invention. Each traffic signal BB has a front diamond shaped face 348, as shown in the elevational view in FIGURE 9, and a rear diamond shaped face 350, as shown in the elevational view in FIGURE 10. As illustrated in FIGURE 9, the front face 348 of each signal BB includes four signal lenses 352, 354, 356 and 358, each of which preferably is a triangular quadrant of a square, with the 90° apex of each lens located at the center of the signal face. Yellow lamps BBLA, BBLB, BBLC and BBLD are located within the signal BB immediately behind lenses 352, 354, 356 and 358, respectively. A red lamp BBLS is also located behind each lens. Lenses 352, 354, 356 and 358 may be transparent, with the background within the signal BB being black so that when none of the lamps is energized a black diamond shaped configuration is presented by signal face 348. When one of the yellow lamps is energized to illuminate one of the triangular shaped lenses, the 90° apex of that lens provides a visual directional command signal to an aircraft pilot. Thus, for example, when lamp BBLD, behind lens 358, is energized, the 90° apex of that lens indicates to an aircraft pilot that the aircraft should proceed into an intersection and make a half right turn. A full right turn is indicated by energization of lamps BBLB and BBLC behind lenses 354 and 356, respectively, so that the 90° apex of the triangle defined by the two lenses provides a visual directional command signal for an aircraft pilot to make a full right turn. Similarly, when lamps BBLA and BBLD are energized an aircraft pilot is presented with a visual command signal to make a full left turn when entering an intersection. Also, as is now evident, when both lamps BBLA and BBLB are energized an aircraft pilot is presented with a visual directional command signal to proceed straight through an intersection. Lamps BBLA, BBLB, BBLC and BBLD are selectively energized in accordance with a program entered by an airport ground traffic director, as will be described in greater detail hereinafter. All lamps BBLS are energized at the same time to provide a red diamond shaped visual command signal representative that an aircraft pilot is to stop and not proceed into an intersection until a yellow directional signal is displayed.

The rear side 350 of each traffic signal BB faces an intersection and includes a large triangular lens 360, which preferably takes the form of one-half of a square with its 90° apex pointed in an upward direction. Behind lens 360 there is provided at least one yellow pull through lamp BBLR. Due to the large lens surface area it may be desirable to provide two lamps BBLR, as shown in FIGURE 10. Since the rear side 350 of traffic signal BB faces an aircraft located in an intersection, the energization of lamps BBLR serves to provide a yellow visual command signal to an aircraft pilot representative that the aircraft should pull through the intersection, i.e., proceed through the intersection, into the intersection arm at which the pull through signal lamps BBLR are energized. The lower half 362 of the rear side 350 of each traffic signal BB is preferably colored black so that when lamps BBLR are energized only the upper lens 360 transmits a visual command signal to an aircraft pilot.

SYSTEM INTERCONNECTIONS

Referring now to FIGURE 11, there is shown a block diagram of the system's functional and electrical interconnections. The display panel DP, best shown in FIGURES 1 and 2, is electrically connected with a control console CC which includes the electrical control circuitry, described in greater detail hereinafter with reference to FIGURE 12. The control console CC is electrically connected with the traffic signals BB, best shown in FIGURES 8, 9 and 10. The detector stations DS1 and DS2, best shown in FIGURE 8, are electrically connected to the control console CC for relaying output signals representative of an aircraft's location on the actual network. The control console CC has a first electrical feedback alarm path connected with the display panel DP for energizing alarm lamps AL, as well as an audible alarm buzzer AB, discussed in greater detail hereinafter with reference to FIGURE 12. The control console CC also includes a second electrical feedback path connected to the display panel for purposes of energizing program lamps PL, detector lamps DL and intersection lamps DLC.

GENERAL OPERATION

For purposes of simplifying the understanding of the present invention, the following is a general description of operation given with reference to FIGURES 1 through 11. A more detailed description of operation is given hereinafter with reference to the logic control and switching circuitry illustrated in FIGURE 12.

Referring now to FIGURE 8, there is illustrated a four arm intersection C having north, east, south and west intersection arms. As an aircraft approaches the intersection from the west arm, it first crosses loop detector LD associated with detector station DS1. This energizes directional lamp DLI in the control panel's west arm (see FIGURE 2), indicating to a traffic director that an aircraft has been detected in the west arm and is proceeding in an easterly direction toward intersection C. The traffic director may enter a programmed route for the aircraft to proceed through intersection C by tracing a route with stylus S on the display panel DP, illustrated in FIGURE 2, from, for example, the west arm through the intersection C and thence in a southward direction through the south arm. The stylus S sequentially actuates program switches PES, PS1 and PS2 in the west arm and then sequentially actuates switches PS2, PS1 and PES in the south arm. Actuation of these switches results in various program lights being energized; namely, program tail light PLE associated with the west arm indicating that an aircraft may enter the intersection from the west arm, and program lights PLE and PLL of the light module associated with the south arm indicating that aircraft may proceed from the intersection C into the south arm. Thus, the energization of these lights serve as a memory for the traffic director as to the program entered. In addition, the actuation of these program switches energizes lamps BBLB and BBLC (see FIGURE 9) of the front face 348 of the traffic signals BB associated with the west arm, which provides visual directional command signals for the aircraft to enter the intersection C and make a full right turn. Actuation of the program switches in the south arm of the control panel energizes lamps BBLR on the rear side 350 of the traffic signals BB associated with the south arm, presenting visual directional command signals for the aircraft to pull through intersection C and proceed from the intersection into the sourth arm.

The aircraft proceeds into the intersection C actuating loop detector LD associated with detector station DS2 of the west arm. This de-energizes detector light DLI in the west arm of the display panel and energizes the intersection light DLC in the display panel at intersection C, indicating to the traffic director that the aircraft has left the west arm and is now present in the intersection.

As the aircraft proceeds into the south arm it crosses loop detector LD associated with detector station DS2 in the sourth arm. This de-energizes the intersection light DLC and energizes detector light DLO associated with the south arm on the display panel, representing to the traffic director that the aircraft has left the intersection and is proceding into the south arm. At this point, the aircraft has proceeded exactly as instructed by the route programmed by the traffic director. If the aircraft proceeded into intersection C, as commanded by the programmed route, and continued straight ahead into the east intersection arm actuating detector station DS2 associated with the east arm, audible alarm buzzer BR is energized to alert the traffic director as to the aircraft's noncompliance with the programmed route. In addition to the audible alarm, alarm lamp AL at the center of intersection C on the display panel is energized and alternately flashes on and off with a red signal indicating the location of the alarm condition. In addition to the audible and visual alarm, all directional yellow lamps are extinguished and red lamps BBLS (see FIGURE 9) in all traffic signals BB located at intersection C are energized until the noncompliance situation is remedied, as by radio communication with the aircraft's pilot, and the traffic director has reset the alarm.

The traffic director may change the programmed route by rerouting stylus S through the display panel's illustrated network. In the event that the traffic director desires to erase the entire program, leaving the intersection with all stop lights, i.e., energization of all red lamps BBLS, this may be accomplished by actuating a program erase switch PES with the magnetic stylus S. Program switches PS1 and PS2 of each intersection arm in the display panel serve, by means of control logic circuitry, to interpret the direction traced by stylus S and energize the appropriate display panel presence lights PL and the appropriate intersection traffic signals BB. Thus, for example, if program switch PS1 is actuated before program switch PS2, the control logic circuitry enters a program representative that an aircraft is to enter an intersection from the arm associated with these program switches. Conversely, if program switch PS2 is actuated before program switch PS1 is actuated, a program is entered for an aircraft to leave the intersection through the arm associated with these program switches. The fourth magnetic reed switch DES associated with each arm, but spaced transversely away from groove 306, serves as a detector erase switch so that, when armed, it is capable of de-energizing an aircraft presence light DLI or DLO associated with that intersection arm on the display panel. Thus, for example, if aircraft presence light DLI in the south arm is energized and no aircraft is present in the area of influence of loop detector LD at detector station DS1 in the south arm of the actual network, the traffic director may extinguish this false indication by actuating the detector erase switch DES associated with the display panel's south arm. The detector erase switch DES must be armed, as will be described in greater detail hereinafter with reference to FIGURE 12, by first actuating a detector reset switch so that a true presence signal indication is not erased inadvertently.

Figure 12:
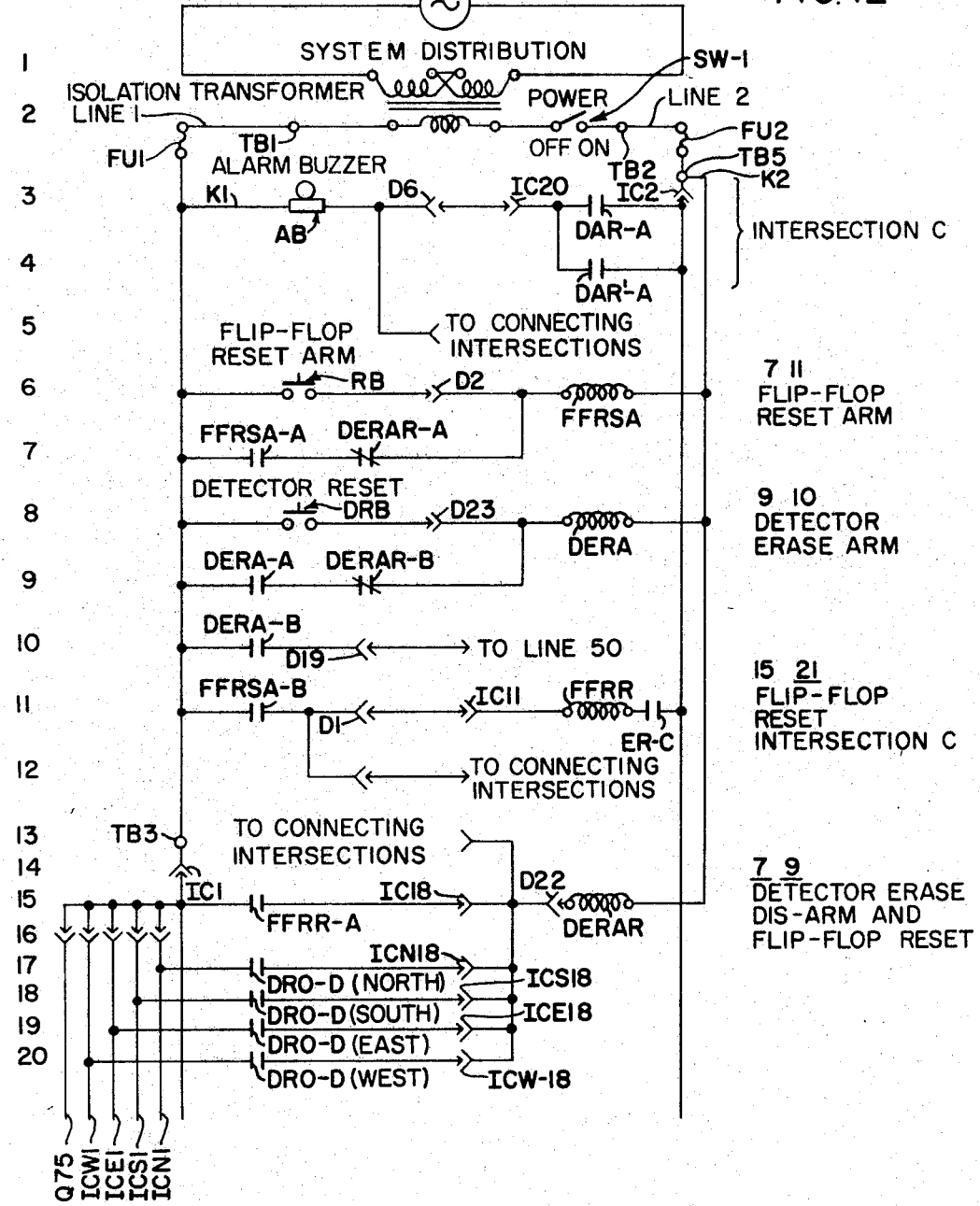
FIGURES 12 to 12J is a single figure illustrating a schematic circuit diagram of the electrical control circuit.
Figure 12A:
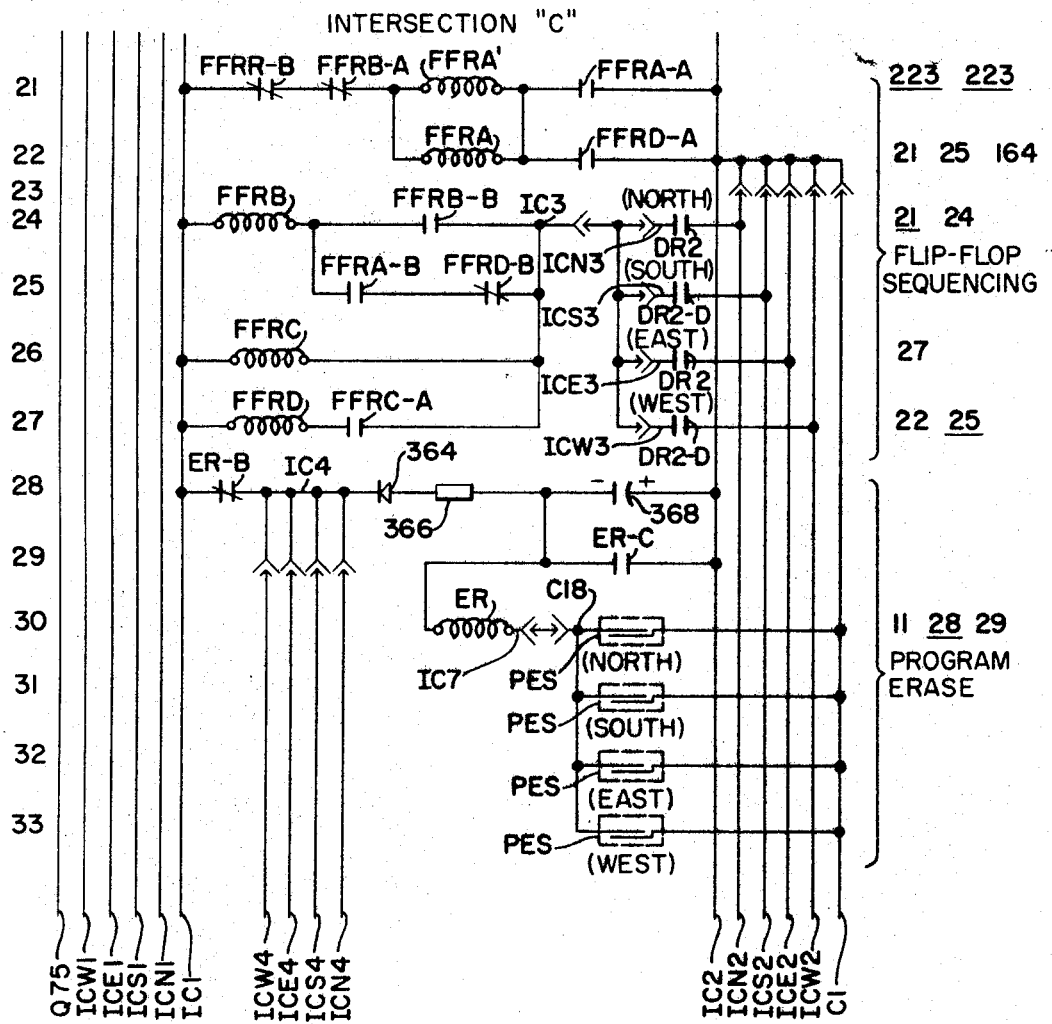
Figure 12E:
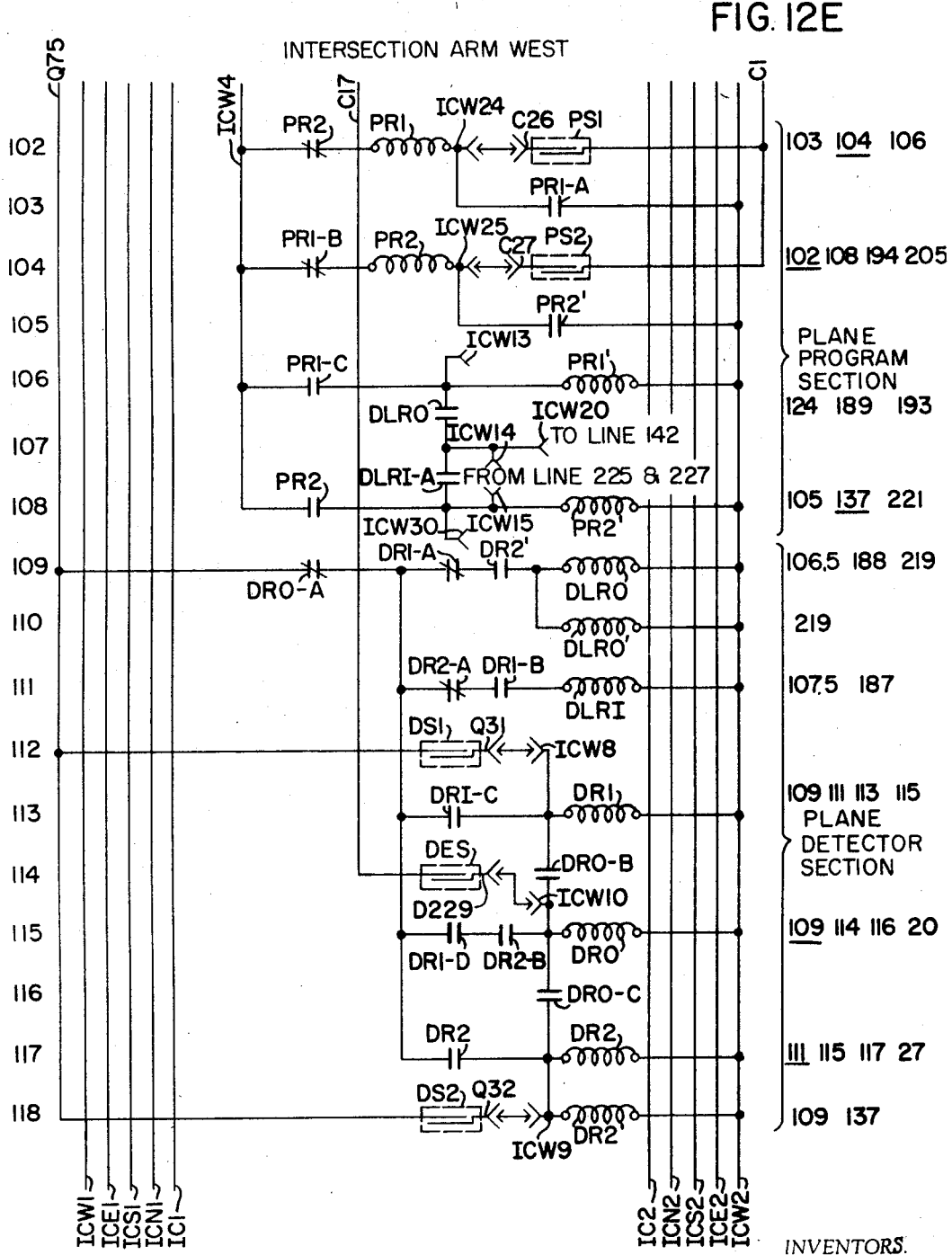
Figure 12F:
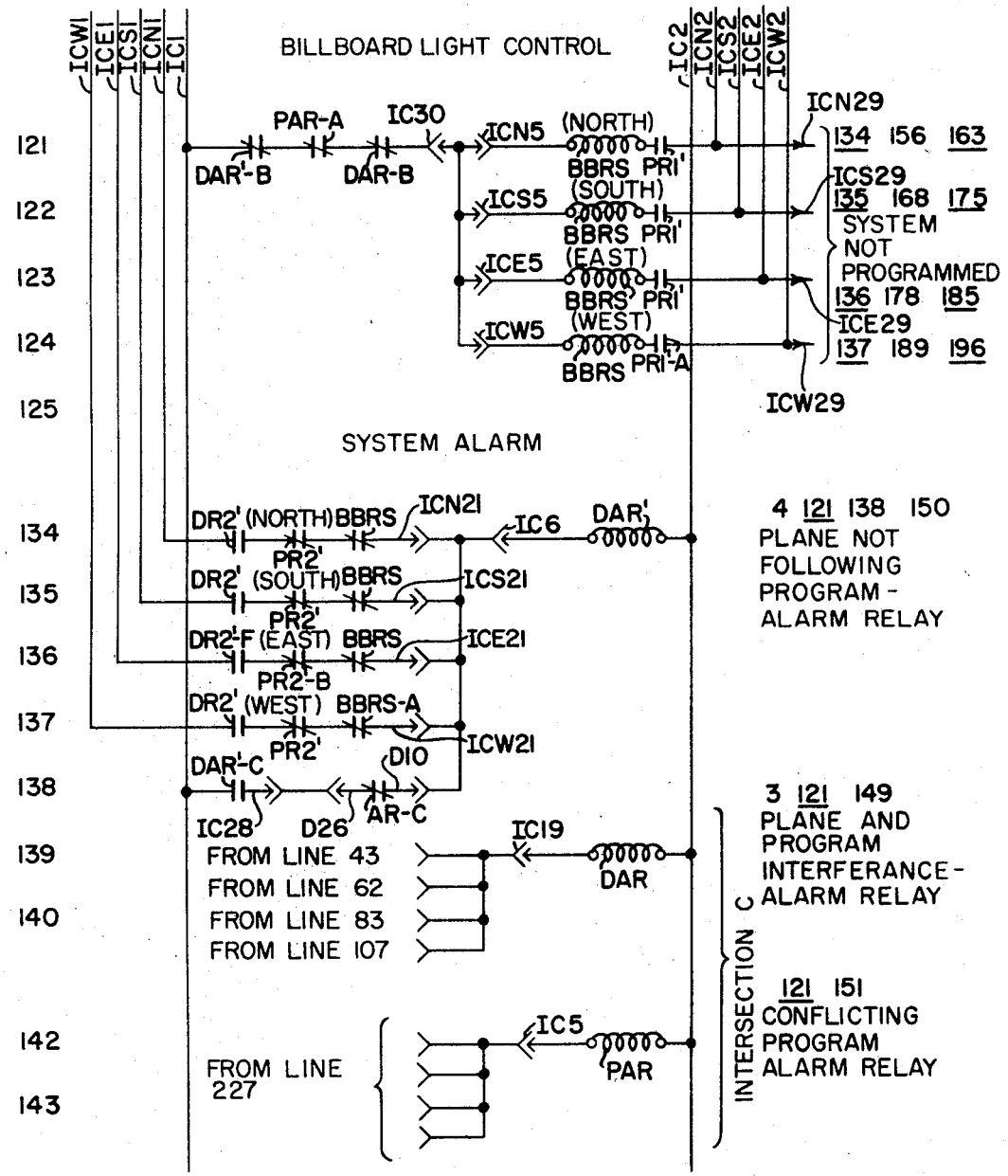
Figure 12H:
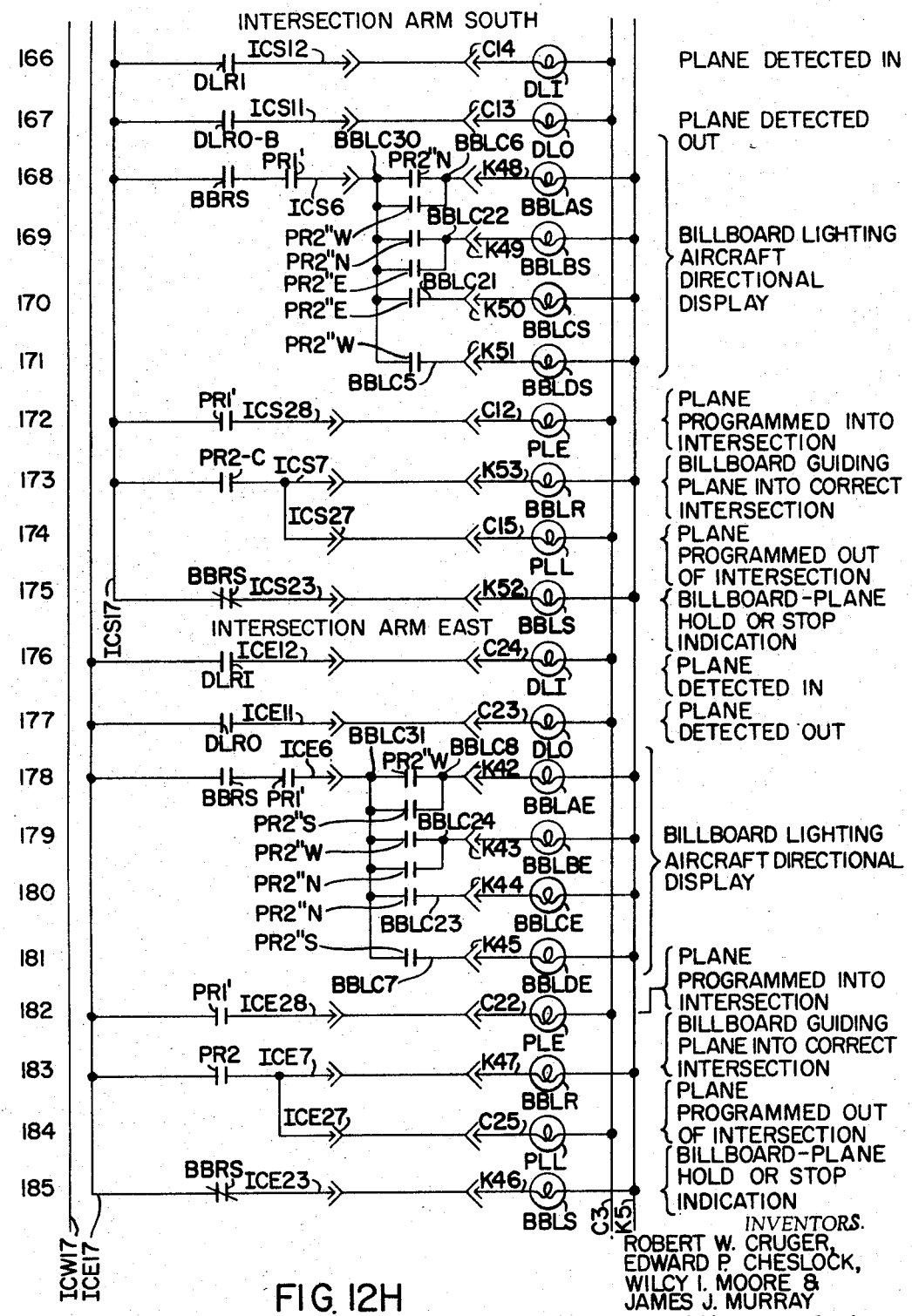
Figure 12I:
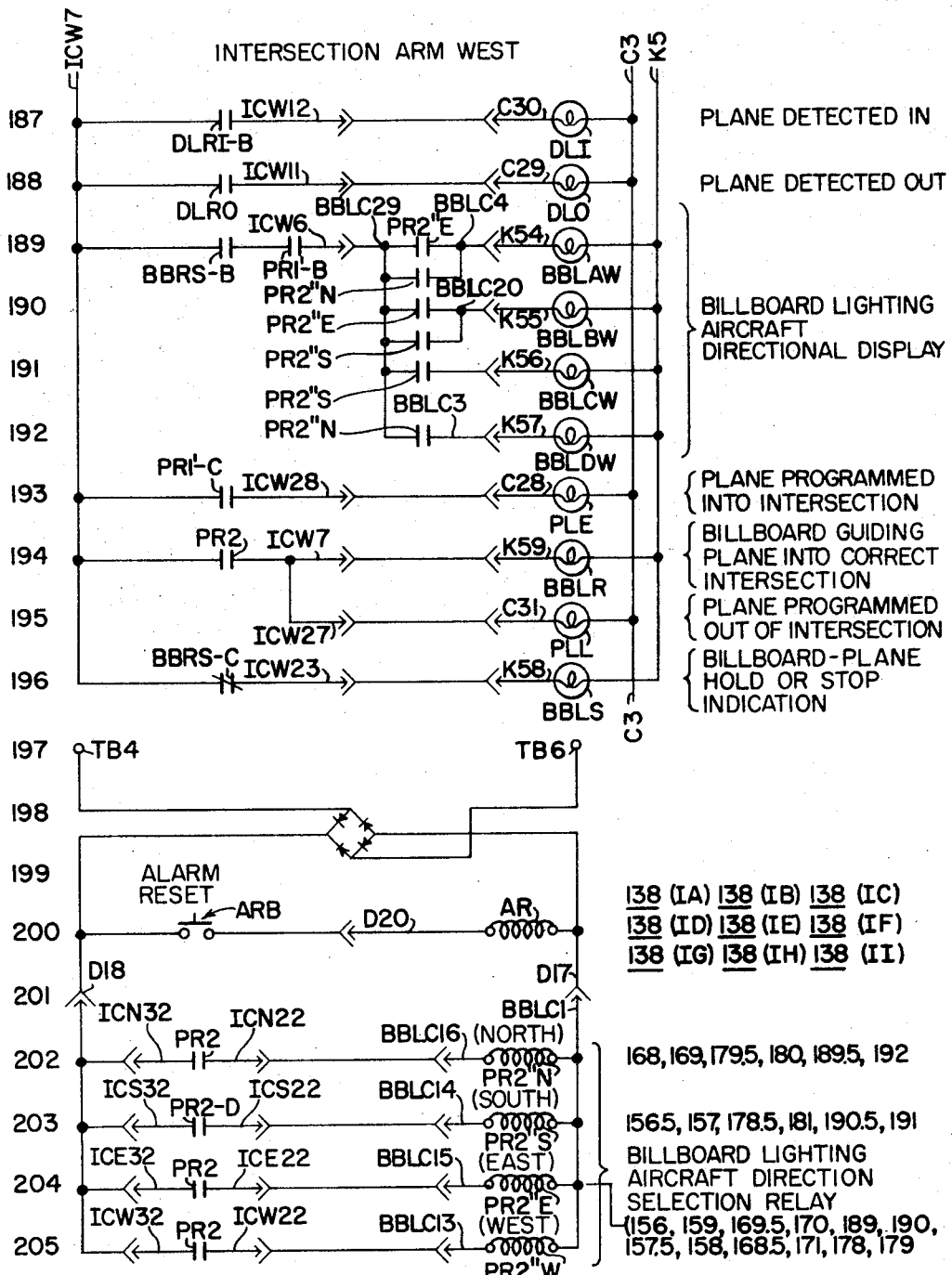

The display panel's alarm lamp AL is energized to provide a flashing red signal whenever a programming error occurs and no aircraft is involved. Such a situation occurs, for example, when a program is entered at intersection C directing an aircraft to intersection B while at the same time a program already exists at intersection B directing another aircraft toward intersection C. The reason for the visual alarm only in such a situation, is that this condition exists quite frequently when the traffic director programs a completely new route. A second type of alarm provided by the invention is both a visual and audible alarm. That is, alarm buzzer AB, FIGURE 12, is energized at the same time that alarm lamp AL is flashing a red signal at the center of the intersection, or intersections, involved. The audible part of this alarm is actuated whenever an aircraft is involved. The following conditions actuate this alarm:

(1) When an aircraft runs a red light, that if, if an aircraft crosses the loop detector at detector station DS2 on its approach to an intersection when the traffic signal BB for the associated intersection arm is displaying a red signal, indicating a stop command.

(2) If a wrong turn is executed, that is, if an aircraft is given a directional command by a traffic signal BB and then enters the intersection but proceeds to leave the intersection in any direction other than the one to which the aircraft has been programmed.

(3) If a program is entered by the traffic director which would create a potential collision with a detected aircraft approaching the intersection in question; for example, if a program is entered for the west arm of the intersection for an aircraft to proceed to the south arm and an aircraft is already present in the south arm approaching the intersection.

(4) If a program is entered by the traffic director that would create a potential collision, thus, for example, if the traffic director enters a program for an aircraft to proceed from the west arm through the intersection and then to the south arm, and at the same time an aircraft from an interconnecting intersection is detected as leaving the connecting intersection in a northerly direction through the south arm of the programmed intersection.

Under any alarm situation; that is, whenever flashing red signal light lamp AL is energized, the appropriate traffic signals BB display all red signals at the intersection or intersections involved, stopping traffic flow. The program lights at the display panel, however, remain energized to assist the traffic director in determining the cause for the alarm. After the alarm situation has been remedied, the traffic director resets the alarm by means of a separate manual alarm reset switch. Once the alarms have been reset, a program may be re-entered on the intersection traffic signals BB. The manual alarm reset feature serves as an additional check on both the system and the traffic director to insure that the alarm situation has been corrected before authorization is given to an aircraft to proceed through the intersection in question.

The system also includes a priority circuit which serves to provide a clearance signal condition for active runways in the event that taxiways, or other active runways, cross the active runway in question. The priority circuit energizes all the traffic signals BB to display stop, i.e., red, signals for the cross traffic to the active runway in question. This circuit also energizes the active runway traffic signals to display a yellow, i.e., go, signal when the runway is clear for use.

CONTROL CIRCUITRY

Figure 12J:
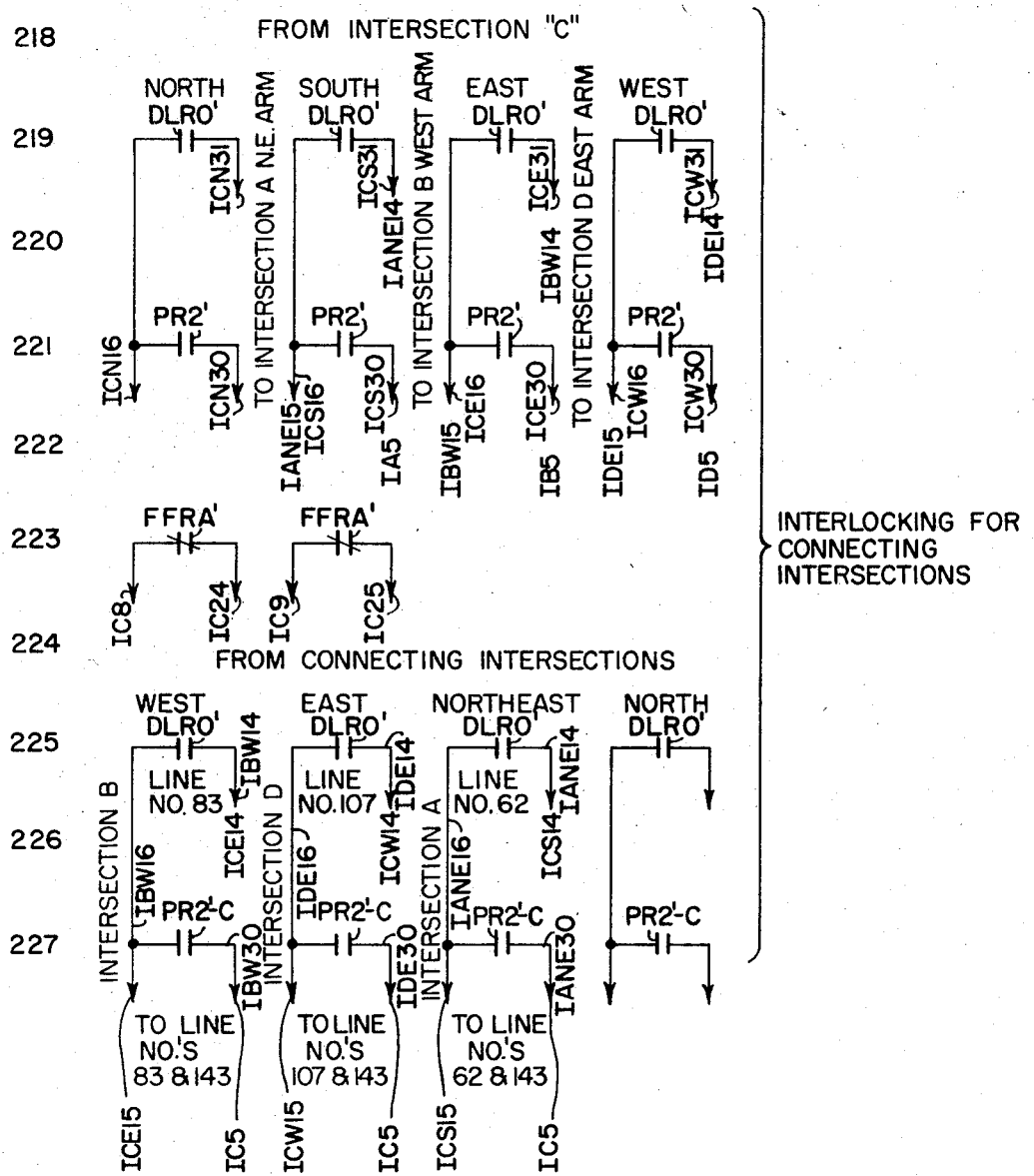

Referring now to FIGURES 12 through 12J, which comprises a single figure, there is schematically illustrated the electrical control circuitry for accomplishing the functions desribed hereinbefore. As will be appreciated, the circuitry takes the form of logic and switching circuits including a plurality of electromechanical relays. It is to be apprecitaed that other forms of circuitry may be substituted for that illustrated in FIGURE 12 such as, for example, solid state logic and static switching circuitry. For purposes of simplifying the understanding of the invention, circuit line numbers 1 through 228 appear on the left hand side of each FIGURE 12 through 12J. At the right hand side of each FIGURE 1 through 12J there is provided a plurality of relay identifying numbers referring to various circuit lines. The relay identifying numbers at each circuit line indicates that the relay at that circuit line has relay contacts at the reffered to circuit lines. Normally closed relay contacts are located at the designated underscored circuit line numbers. Otherwise, the relay contacts are normally open. To further facilitate the understanding of the circuitry, reference should be made to Table I which serves as a glossary of the designations and legend provided in FIGURES 12 through 12J.

TABLE I

| Designation: | Description |
| --- | --- |
| PS1 | Program switch. |
| PR1 | Program relay to enter intersection. |
| PS2 | Program switch. |
| PR2 | Program relay to leave intersection. |
| PLE | Program light to enter intersection (green). |
| PLL | Program light to leave intersection (green). |
| PES | Program erase switch. |
| ER | Program erase relay. |
| BBLR | Pull through signal lights (yellow). |
| BBLA | Upper left signal quadrant light (yellow). |
| BBLB | Upper right signal quadrant light (yellow). |
| BBLC | Lower right signal quadrant light (yellow). |
| BBLD | Lower left signal quadrant light (yellow). |
| BBLS | Stop signal (red). |
| DS1 | Detection station No. 1. |
| DR1 | Detector relay actuated by DS1. |
| DS2 | Detector station No. 2. |
| DLR1 | Detector light relay-aircraft heading into intersection. |
| DLI | Detector light for aircraft heading into intersection (yellow). |
| DLRO | Detector light relay, aircraft heading out of intersection. |
| DLO | Detector light for aircraft heading out of intersection (yellow). |
| DRO | Detector logic reset relay. |
| FFR | Flip-flop relay. |
| DLC | Detector light for aircraft in center of intersection (yellow). |
| DES | Detector erase switch. |
| DERA | Detector erase relay—arm. |
| DERAR | Detector erase relay—reset. |
| AR | Alarm reset relay. |
| DAR | Detector alarm relay. |
| PAR | Program alarm relay. |
| AL | Alarm light (flashing red). |
| C.I. | From connecting intersection. |
| AB | Alarm buzzer. |
| DRB | Detector reset button. |
| RB | Flip-flop reset button. |
| ARB | Alarm reset button. |
| BB | Aircraft intersection traffic signal. |

| Designation: | Description |
| --- | --- |
| DP | Display panel. |
| CC | Control console. |
| S | Magnetic stylus. |
| Capacitor 368 | 2 microfarad capacitor. |
| Diode 364 | IN540. |
| Resistor 366 | 220 kilohms. |

DETAILED DESCRIPTION OF OPERATION

The following is a detailed description of operation given with respect to FIGURES 12 through 12J. The description, for purposes of simplifying the understanding of the invention, is divided into six parts; namely Part I, Program Logic; Part II, Program Erase Logic; Part III, Detector Logic; Part IV, Detector Erase Logic; Part V, Flip-Flop Reset Arm Logic; and, Part VI, Alarm Logic.

Part I, program logic

*General.*—The following circuit description is based on a program being initiated by a ground traffic director stationed at the display panel DP (FIGURES 1 and 2). The program, lighting, erase, and light switching is accomplished by the traffic director passing magnetic stylus S over reed switches PES, PS1, and PS2 located in the display panel. When, for example, the traffic director realizes that an aircraft or vehicle is ready to leave the airport terminal area, he must race the magnetic stylus S over the display panel DP, creating the desired traffic pattern to be followed by the aircraft or vehicle to a priority runway etnrance. In the following circuit description, it is assumed that: (1) there is no previous program entered on the display panel; (2) all airport runway intersection traffic signals BB are red, indicating a "stop" or "hold" condition to the aircraft or vehicle. Also, it is to be understood that all intersection arm logic modules are electrically equivalent. Therefore, the circuit description for any one intersection arm applies equally to all intersection arms, regardless of the number.

*Circuit description.*—The following circuit discussion is based on the premise that the ground controller is programming the aircraft through intersection C by tracing a route with stylus S from the west arm, through the intersection and thence through the south arm.

To accomplish this program, six magnetic switches are actuated in the following sequence: PES, PS1, PS2; PS2, PS1 and PES. The first three switches correspond to the west arm and the second three to the south arm. In order to transmit the desired command, the traffic director passes the magnetic stylus S over the desired path on the display panel so as to first actuate program erase switch PES (west line 33). Upon closing this switch, any previous program through the intersection will be cleared. This function will be discussed later in detail.

The stylus S next closes program switch PS1 (west line 102), energizing relay PR1 (west line 102), through normally closed contact PR2–A (west line 102) and normally closed contact ER–B (intersection C line 28). Relay PR1 (west line 102) holds in through its own normally open contact PR1–A (west line 103) bypassing program switch PS1 (west line 102). A third normally open contact PR1–C (west line 106) also closes, energizing relay PR1′ (west line 106).

Normally open contact PR1′–A (west line 124) closes, energizing relay BBRS (west line 124) through a permissive circuit composed of normally closed, de-energized, alarm contacts DAR′–B, PAR–A and DAR–B (intersection C line 121). Normally open contact PR1′–C (west line 193) closes, lighting indicating light PLE (west line 193). This indicating light displays to the traffic director that an aircraft or vehicle has been programmed into the intersection. This indicating light is located on the traffic director's display panel DP and appears as the tail of an arrow, as shown in FIGURES 2 and 5B. Normally closed contact BBRS–C (west line 196) opens, de-energizing stop light BBLS (west line 196). The stop light is located at the west runway intersection arm.

Proceeding through the intersection arm, the magnetic stylus S next momentarily closes program switch PS2 (west line 104). However, its associated relay does not close, due to normally closed contact PR1-B (west line 104) being open. The traffic director then passes magnetic stylus S out of the west intersection arm and into the south intersection arm, thereby indicating the direction the aircraft or vehicle is to traverse.

In order to accomplish the above, magnetic stylus S first closes program switch PS2 (south line 59), energizing relay PR2 (south line 59) through normally closed contact PR1-B (south line 59) and normally closed contact ER-B (intersection C line 28). Normally open contact PR2-B (south line 63) closes, energizing relay PR2' (south line 63). Normally open contact PR2'-A (south line 60) closes, bypassing program switch PS2 (south line 59) and holding in relay PR2 (south line 59).

Normally open contact PR2-C (south line 173) closes, energizing indicating light PLL (south line 174) on the traffic director's display panel DP. The function of this indicating light is to display to the traffic director in which he has programmed the aircraft or vehicle out of the intersection. This indicating light is an arrowhead and tail, as shown in FIGURE 5B. Normally open contact PR2-C (south line 173) also energizes signal light BBLR (south line 173) which is a stylized arrowhead at the rear of traffic signals BB, located on both sides of the intersection arm on the airfield into which the aircraft or vehicle has been programmed. The function of this pair of directional lights is to guide the aircraft or vehicle into the correct intersection arm in the event a multiplicity of intersection arms exist.

Normally open contact PR2-D (south line 203) closes, energizing relay PR2″ (south line 203). This relay is a directional selection relay which causes the following to occur: normally open contacts PR2″-D (south line 190.5) and PR2″-F (south line 191) close, in series with normally open contacts BBRS-B (west line 189) and PR1'-B (west line 189), which have both been previously closed by the traffic director's program. This permissive circuit then energizes directional lights BBLBW (west line 190) and BBLCW (west line 191). These directional lights are located in a pair of signals BB on the airfield at the west intersection arm and indicate to the aircraft the direction it is to follow once it enters the intersection.

Proceeding through the intersection arm the magnetic stylus S next momentarily closes program switch PS1 (south line 57). However, its associated relay is not actuated, due to normally closed contact PR2-B (south line 57) being open.

As the traffic director moves magnetic stylus S out of the south intersection arm, stylus S closes program erase switch PES (south line 31). Due to the short interval of time that elapses between closing program erase switches PES (west line 33) and PES (south line 31), the capacitor 368 in line 28 does not have a sufficient charge built up to energize relay ER (intersection C line 30) and, therefore, the program does not erase.

If the program continues into and out of additional intersections, the program logic functions in the same manner as in the previous description.

Part II, program erase logic

*General.*—As described in Part I, the traffic director passed magnetic stylus S into the west intersection arm, closing program erase switch PES (west line 33), erasing any preceding program and that as he proceeded with the programming from the west intersection arm into and out of the south intersection arm, stylus S closed program erase switch PES (south line 31) which did not erase the program just inserted.

*Circuit description.*—The capacitor 368 (intersection C line 28) is in a normally charged state so that whenever any one of the program erase switches (PES north line 30, PES south line 31, PES east line 32 and PES west line 33) are closed, the capacitor discharges. The discharge of the capacitor energizes relay coil ER (intersection C line 30) for a small increment of time. This time is governed by the bleed-off rate of the capacitor through normally open contact ER-C (intersection C line 29) closing. Normally closed contact ER-B (intersection C line 28) opens, interrupting power to all program logic relays previously discussed, erasing any existing program of that intersection. This contact remains open until such time as capacitor 368 discharges sufficiently to allow relay coil ER (intersection C line 30) to drop out.

Since it is readily apparent that stylus S actuates two program erase switches within a short period of time, one and then the other, it is also apparent that the stylus should not erase a program just inserted with the latter of the two program erase switches. Therefore, in order to preserve the program just inserted, the time required to charge the capacitor is so controlled that it cannot recharge sufficiently to pull in relay coil ER (intersection C line 30) when the second program erase switch is closed. This time lapse, therefore, preserves the newly inserted program. This time lapse, however, must be of a duration short enough to insure rapid reprogramming in the event of a programming error. Since the given line voltage governs the steady sate charged capacitor voltage, the minimum capacitance is determined by the energy requirement of the relay. The time lapse is therefore governed by the series resistance in the resistance/capacitance circuit, including diode 364, poled as shown, and resistor 366.

Part III, detector logic

*General.*—In Parts I and II, the program sequence has been described as initiated and prescribed by the traffic director stationed at the display panel. The following description is directed toward the sequence of events as caused by the aircraft or vehicle leaving the terminal area and following the prescribed program. Installed on the airport, as previously mentioned, are two aircraft detectors for each arm of an intersection.

*Circuit description.*—The aircraft leaves the terminal area and taxis into the first intersection arm, closing detector station contact DS1 (west line 112). The closing of this contact energizes relay DR1 (west line 113). Normally open contact DR1-C (west line 113) closes, holding in relay DR1 (west line 113) through a normally closed contact DRO-A (west line 109), bypassing detector contact DS1 (west line 112). Normally closed contact DR1-A (west line 109) opens, preventing the energization of relay DLRO (west line 109). Normally open contact DR1-B (west line 111) closes, energizing relay DLRI (west line 111) through a permissive circuit composed of normally closed contacts DR2-A (west line 111) and DRO-A (west line 109). Normally open contact DR1-D (west line 115) closes in the permissive circuit to relay DRO (west line 115).

Normally open contact DLRI-A (west line 107.5) closes and becomes a function of the permissive circuit to the alarm relay DAR (intersection A line 139). Normally open contact DLRI-B (west line 187) closes, energizing indicating light DLI (west line 187) on the display panel. This indicating light displays an indication to the traffic director that an aircraft or vehicle is present in the west intersection arm and is proceeding into the intersection.

The aircraft or vehicle proceeds along the intersection arm, closing detector station contact DS2 (west line 118). Detector contact DS2 (west line 118) energizes relay DR2 (west line 117) and relay DR2' (west line 118) which both hold in around detector switch DS2 (west line 118), through normally open contact DR2-C (west line 117) and normally closed contact DRO-A (west line 109). Normally closed contact DR2–A (west line 111) opens, deenergizing relay DLRI (west line 111) and thereby deenergizing indicating light DLI (west line 187) by allowing normally open contact DLRI–B (west line 187) to reopen. Normally open contact DR2–B (west line 115) closes and completes the permissive circuit, energizing relay DRO (west line 115). Normally open contact DR2–D (west line 27) closes, energizing relay FFRC (intersection C line 26) in the Flip-Flop Sequence Circuit.

Normally open contact FFRC–A (intersection C line 27) closes, in series with previously closed normally open contact DR2–D (west line 27), completing the permissive circuit and energizing FFRD (intersection C line 27). Normally open contact FFRD–A (intersection C line 22) closes, energizing relay FFRA (intersection C line 22) and relay FFRA′ (intersection C line 21). Normally open contact FFRA–A (intersection C line 21) closes, holding in relay FFRA (intersection C line 22) in series with normally closed contacts FFRR–B (intersection C line 21) and FFRB–A (intersection C line 21). Normally open contact FFRA–B (intersection C line 25) closes in the permissive circuit of flip-flop relay FFRB (intersection C line 24). Simultaneously, normally open contact FFRA–C (intersection C line 164) closes, lighting indicating light DLC (north line 164). This indicating light is located on the display panel at the center of intersection C. This indication displays to the traffic director that the intersection is occupied by an aircraft or vehicle. Simultaneously, normally closed contact DRO–A (west line 109) opens, de-energizing relays DR1 (west line 113), DRO (west line 115) and DR2 (west line 118) in the detector circuit. The detector circuit is now reset and ready to signal the arrival of the next aircraft or vehicle. The flip-flop circuit is also set for completion as soon as the aircraft or vehicle leaves the intersection.

In the event the aircraft or vehicle remains at rest over loop detector LD at detector switch DS2 (west line 118), detector circuit is not reset. Therefore, normally open contacts DRO–B (west line 114) and DRO–C (west line 117) close, providing a secondary hold-in circuit for the detector logic through detector contact DS2 (west line 118). This circuit is maintained until such time as the aircraft or vehicle clears the detector contact DS2 (west line 118), allowing the circuit to reset.

The aircraft or vehicle then proceeds into the south intersection arm, as programmed by the traffic director, closing detector contact DS2 (south line 75). Detector contact DS2 (south line 75) energizes relay DR2 (south line 74) and relay DR2′ (south line 75), initiating the following sequence of events: normally closed contact DR2–A (south line 66) opens, preventing the operation of relay DLRI (south line 66). Normally open contact DR2–B (south line 72) closes in the permissive circuit to relay DRO (south line 72). Normally open contact DR2–C (south line 74) closes, holding in relay DR2 (south line 74) and relay DR2′ (south line 75) through normally closed contacts DRO–A (south line 64), by-passing detector contact DS2 (south line 75). Normally open contact DR2–D (south line 25) closes, energizing relay FFRB (intersection C line 24) through a previously closed normally open contact FFRA–B (intersection C line 25) and a normally closed contact FFRD–B (intersection C line 25).

Normally closed contact FFRB–A (intersection C line 21) opens, de-energizing relay FFRA (intersection C line 22). Normally open contact FFRA–C (intersection C line 164) reopens, causing indicating light DLC (north line 164) to go out. This displays to the traffic director that the intersection is clear. Normally open contact FFRB–B (intersection C line 24) closes, holding in relay FFRB (intersection C line 24) through normally open contact DR2–D (south line 25). During this sequence of events, relay FFRC (intersection C line 26) and FFRD (intersection C line 27) are energized, but due to a built-in time lag, have no effect upon the circuit operation.

Normally open contact DR2′–D (south line 64) closes, energizing relay DLRO (south line 64) through normally closed contacts DRO–A (south line 64) and DRI–A (south line 64). Normally open contact DLRO–B (south line 167) closes, energizing indicating light DLO (south line 167) on the display panel. This light furnishes a display to the traffic director that the aircraft or vehicle has entered the south intersection arm.

The aircraft or vehicle in obedience to the pull through signals, proceeds through the south intersection arm closing detector contact DSI (south line 67) and energizes relay DR1 (south line 70). Normally closed contact DR1–A (south line 64) opens, de-energizing relay DLRO (south line 64) and relay DLRO′ (south line 65). Normally open contact DLRO–B (south line 167) reopens, de-energizing indicating light DLO (south line 167). This indicates to the traffic director that the south intersection arm is now clear. Normally open contact DR1–C (south line 70) closes, holding in relay DR1 (south line 70) through normally closed contact DRO–A (south line 64). Normally open contact DR1–C (south line 72) closes, energizing relay DRO (south line 72) through previously closed normally open contact DR2–B (south line 72) and normally closed contact DRO–A (south line 64).

Normally closed contact DRO–A (south line 64) opens, de-energizing relays DR1 (south line 70), DRO (south line 72) and DR2 (south line 74) in the detector circuit. The detector circuit is now ready to signal the arrival of the next aircraft or vehicle.

In the event the aircraft or vehicle remains at rest upon detector contact DS1 (south line 67), the detector circuit does not reset. Therefore, normally open contacts DRO–B (south line 71) and DRO–C (south line 73) close, providing a secondary hold-in circuit for the detector logic through detector contact DS1 (south line 67), until such time as the aircraft or vehicle is clear of the detector contact DS1 (south line 67), allowing the circuit to reset. (Refer to FIGURE 8.)

The aircraft or vehicle would continue through additional intersections following the prescribed programmed course. The corresponding detector logic circuit functions in the same manner as in the previous description.

It should be noted that the flip-flop circiut contains two relays. The previously mentioned time lag is accomplished by simply having the actuation of relay FFRD (intersection C line 27) be delayed by the pull in time of relay FFRC (intersection C line 26). This delay could be obtained by using a special slow operating relay to replace the FFRD and FFRC relays.

Part IV, detector erase logic

*General.*—Since the logic of the detector circuit is self-resetting, there is a requirement for a simple means of manually resetting the detector indications. For example, if a vehicle in taking a "short-cut" approaches an intersection and is detected by only the first detector and no others, it would be necessary for the traffic director to clear the detector light indication from the display panel. In order to accomplish this, the traffic director depresses the detector reset button DRB (system distribution line 8) and actuates the appropriate detector erase switch DES on the intersection arm of the display panel with magnetic stylus S. This procedure is necessary so that the detector logic cannot be inadvertently erased without first arming the system.

*Circuit description.*—The traffic director depresses the detector reset button DRB, energizing relay DERA (system distribution line 8). Normally open contact DERA–A (system distribution line 9) closes in series with normally closed contact DERAR–B (system distribution line 9), holding in relay DERA (system distribution line 8). Normally open contact DERA–B (system distribution line 10) closes in series with the detector erase switches DES (north line 50), DES (south line 71) DES (east line 90) and DES (west line 114), located at the display panel and electrically connected to their respective DRO relays.

Upon completion of the preceding, the traffic director need only close, with magnetic stylus S, the detector erase switch DES adjacent the false indication. As soon as the appropriate detector erase switch DES is closed, its associated reset relay DRO is energized. Normally closed contact DRO-A opens, resetting the intersection arm logic as previously described. Normally open contact DRO-D closes, energizing relay DERAR (system distribution line 15). Normally closed contact DERAR-B (system distribution line 9) opens, de-energizing relay DERA (system distribution line 8). The detector erase logic is reset and the circuit is again ready to monitor additional aircraft or vehicle movement.

Part V, flip-flop reset arm logic

*General.*—If a vehicle enters an intersection, is detected by both detectors DS1 and DS2 in that intersection arm, and then leaves the intersection without being detected, it would be necessary for the traffic director to de-energize the remaining center occupied light DLC on the display panel. This is accomplished by depressing the flip-flop reset button RB, thereby arming the flip-flop reset circuit, and closing any of the program erase switches of the intersection, using magnetic stylus S. This procedure is necessary in order that the flip-flop circuit will not be inadvertently reset without first arming the system.

*Circuit description.*—The traffic director depresses the flip-flop reset arm push button, energizing relay FFRSA (system distribution line 6). Normally open contact FFRSA-A (system distribution line 7) closes in series with a normally closed contact DERAR-A (system distribution line 7), by-passing the flip-flop reset arm push button and holding in relay FFRSA (system distribution line 6).

Normally open contact FFRSA-B (system distribution line 11) closes in the permissive circuit of relay FFRR (intersection C line 11). The traffic director then passes magnetic stylus S over the chosen program erase switch (PES north line 30, PES south line 31, PES east line 32, or PES west line 33), activating the program erase relay ER (intersection C line 30). Normally open contact ER-C (intersection C line 11) closes, energizing relay FFRR (intersection C line 11) through previously closed normally open contact FFRSA-B (system distribution line 11).

Normally closed contact FFRR-B (intersection C line 21) opens, de-energizing relay FFRA' (intersection C line 21) and relay FFRA (intersection C line 22), allowing the flip-flop circuit to reset as previously described. Resetting this circuit de-energizes the detector center light DLC. Normally open contact FFRR-A (intersection C line 15) closes, energizing relay DERAR (system distribution line 15). Normally closed contact DERAR-A (system distribution line 7) opens, de-energizing relay FFRSA (system distribution line 6), completing the reset procedure for the flip-flop circuit.

Part VI, alarm logic

*General.*—There are three different and distinct circuits that comprise the alarm logic: a first circuit for an aircraft or vehicle disobeying a red light of a directional command programmed by the traffic director; a second circuit for an interference between an aircraft and a program; and, a third circuit for two separate interferring intersection programs.

(1) AIRCRAFT OR VEHICLE DISOBEYING A STOP COMMAND

*General.*—In the case of an aircraft or vehicle running a red light, it has been previously stated that both an audio and visual alarm occur. In this description, it is assumed that an aircraft is heading in an easterly direction, approaching the west arm of intersection C.

*Circuit description.*—As the aircraft proceeds into the west arm, detector contact DS1 (west line 112) closes and energizes the associated DR1 relays as previously described. The aircraft continues to enter the intersection, disobeying the red "stop" command. This errant action causes the following events: detector contact DS2 (west line 118) is closed, energizing the associated west DR2' relays, as previously described. Normally open contact DR2' (west line 137) closes. Since normally closed contact PR2' (west line 137) and normally closed contact BBRS (west line 137) are in their normal state, a permissive circuit energizes relay DAR' (intersection C line 134). Normally open contact DAR' (line 150) closes, lighting alarm light AL (intersection C line 149). This alarm light flashes, due to the flasher contact F (system line 148) being alternately opened and closed. This flashing red alarm light is located in the center of intersetcion C on the control panel and serves to advise the traffic director as to the location of the disobedience. In the interim, normally open contact DAR' (line 4) closes, energizing the alarm buzzer (line 3). This buzzer notifies the traffic director that a disobedience has occurred and the alarm light flashes red to locate the error.

In the event that a program has been entered in that intersection, not including the west arm, all traffic signals BB at that intersection go red. This is accomplished by the following events: normally closed contact DAR' (line 121) opens, de-energizing all BBRS relays. Opening of all normally open BBRS contacts on lines 156, 168, 178 and 189, insure that all directional airport signals of that intersection will be inactive. This alarm function also returns all normally closed BBRS contacts (lines 163, 175, 185 and 196) to their "closed" position, energizing all airport directional lamps BBLS for that intersection traffic signals BB to go red, indicating a "stop" or "hold" condition to any aircraft or vehicle approaching the intersection.

The traffic signals BB remain red and the audio and visual alarms remain energized until the alarm is reset by means of the alarm reset button ARB (line 200). This is due to the fact that normally open contact DAR' (line 138) closes and holds in its own relay DAR' (line 134), through normally closed contact AR (line 138). Actuation of alarm reset button ARB (line 200) activates relay AR, causing normally closed contact AR (line 138) to open, interrupting power to relay DAR' (line 134). This, in turn, closes normally closed contact DAR' (line 121) and returns the traffic signals BB to their original state. Normally open contact DAR' (intersection C line 4) opens, de-energizing the alarm buzzer AB (line 3) and normally open contact DAR' (line 150) opens, turning off the flashing alarm light AL (line 149). Thus, the intersection has returned to its original state, with the exception of the errant aircraft or vehicle.

Upon reset of the alarm, the traffic director programs the aircraft or vehicle out of the intersection to prevent further actuation of the alarm circuit.

(2) AIRCRAFT OR VEHICLE DISOBEYS THE PROGRAM

*General.*—It must first be established that an aircraft or vehicle is programmed west to south and, therefore, any deviation from the program will take place in a north or east direction. A west to south program was discussed previously in Part I. Therefore, reference is now made to an aircraft failing to make a turn into the south arm but continuing straight, into the east arm.

*Circuit description.*—The circuit description for the detector logic into the intersection is identical to that previously described. Once in the intersection, the aircraft proceeds into the east intersection arm, closing detector station contact DS2 (east line 94) which energizes relay DR2 (east line 93) and relay DR2' (east line 94). Normally open contact DR2'–F (east line 136) closes in series with PR2'–B (east line 136) and BBRS–A (east line 136), energizing the alarm relay DAR' (intersection C line 134). Both relays PR2' and BBRS are controlled as functions of the programming sequence. Since the aircraft or vehicle was not programmed into the east arm, these relays are in their normal state.

Since all other circuits function as previously described, the prime consideration is the function of relay DAR' (intersection C line 134). Normally open contact DAR'–A (intersection C line 4) closes, energizing the alarm buzzer AB. Normally closed contact DAR'–B (intersection C line 121) opens in the permissive circuits to the intersection BBRS relays, causing them to be de-energized. This causes the aircraft traffic signals BB to turn red, signifying a "stop" or "hold" condition to the aircraft or vehicle. Normally open contact DAR'–C (intersection C line 138) closes, holding in relay DAR' (intersection C line 133) through normally closed contact AR–C (system distribution line 138). Normally open contact DAR'–D (intersection C line 150) closes, energizing alarm flasher light AL (intersection C line 149). Indicator light AL is located on the display panel and serves to inform the traffic director as to where the deviation has occurred.

The alarm signals continue until such time as the traffic director depresses the alarm reset button ARB, energizing relay AR (system distribution line 200). Normally closed AR–C (system distribution line 138) opens, de-energizing relay DAR' (intersection C line 133).

The traffic director must now establish radio contact with the aircraft or vehicle to correct the error.

(3) AIRCRAFT OR VEHICLE INTERFERENCE WITH THE PROGRAM

*General.*—In the discussion of this particular alarm logic it is assumed that a program has been inserted into intersection C from the west arm, into the south arm, as previously described. In addition, it is assumed that an aircraft or vehicle is proceeding in a northerly direction, approaching the south arm of intersection C on a collision course with the program.

*Circuit description.*—It is assumed that an aircraft or vehicle is proceeding in a northerly direction into the south intersection arm but is already through the connecting intersection detector station contacts.

The aircraft or vehicle first closes detector contact DS1 (south line 67), energizing relay DR1 (south line 70), which holds in through its own normally open contact DR1–C (south line 70). Normally open contact DR1–B (south line 66) closes, energizing relay DLRI (south line 66). Normally open contact DLRI–A (south line 62.5) closes and energizes alarm relay DAR (intersection C line 139) through previously closed normally open contact PR2–B (south line 63).

Since all other circuits function as previously described in the detector logic for the west intersection arm, the prime consideration is that sequence of events controlled by alarm relay DAR (intersection C line 139). Normally open contact DAR–A (intersection C line 3) closes, energizing the alarm buzzer AB (system distribution line 3). Normally closed contact DAR–B (intersection C line 121) opens in the permissive circuit to the intersection arm BBRS relays causing them to be de-energized. The directional signals of that intersection go red, as described in the previous alarm description. Normally open contact DAR–C (intersection C line 149) closes, energizing alarm light AL (intersection C line 149). This alarm indicating light is located on the display panel and flashes red to display the intersection in which the intrusion has occurred.

The Alarm circuit is de-energized as soon as the vehicle clears detector contact DS1 (south line 67) and closes detector contact DS2 (south line 75). The alarm may also be de-energized by the traffic director inserting a non-conflicting program.

Reference is now made to a situation wherein the aircraft proceeds into the south intersection arm but then passes into the connecting intersection (C.I.) arm. In doing so, the aircraft or vehicle crosses detector station contact DS2 (C.I.), energizing relay DR2 (C.I.). Normally open contact DR2'–E (C.I.) closes, energizing relay DLRO (C.I. line 225). Normally open contact DLRO–C (C.I. line 225/63) closes, energizing alarm relay DAR (intersection C line 139). It is to be noted that normally open contact DLRO–C (C.I. line 225) is in parallel with normally open contact DLRI–A (south line 62.5), which energized relay DAR (intersection C line 139) in the preceding description. The remainder of the alarm circuit functions as previously described.

It should be noted that, as soon as the aircraft or vehicle moves off detector contact DS2 (C.I.) and closes detector contact DS1 (C.I.), the alarm buzzer and light cease to function. When aircraft or vehicle actuates detector contact DS1 (south line 67), the alarm signals are resumed as previously described. As discussed earlier, the traffic director would reprogram intersection C to eliminate the possibility of a head-on collision.

In the event an aircraft or vehicle is waiting to enter intersection C, holding detector station contact number 1 (DS1 south line 67) closed, relay DLRI (south line 66) is energized and its normally open contact DLRI–A (south line 62.5) is closed. If the traffic director inadvertently programs into an aircraft or vehicle, the following occurs: the traffic director actuates program switch PS2 (south line 59) with stylus S, energizing relay PR2 (south line 59). The combination of now closed, normally open contacts PR2–B (south line 63) and DLRI–A (south line 62.5), energize alarm relay DAR (intersection C line 139). The alarm circuit, in this situation, would normally be reset by a program adjustment in intersection C.

(4) CONFLICTING PROGRAMS

*General.*—This alarm system indicates, by means of a pair of flashing lights on the display panel that a program has been entered which conflicts with an existing program. This involves an attempt by the traffic director to direct two aircraft and/or vehicles on a head-on collision course. The system will not accept the command. To correct this error, the traffic director must erase either of the conflicting pair, as previously described and, if desired, enter a new program. The following description assumes that a program has been entered from the west intersection arm, into the south intersection arm.

*Circuit description.*—In this description, it is assumed that the traffic director attempts to program a connecting intersection C.I. to the south arm of intersection C. With reference to the previously described program description, the traffic director actuated program switch PS2 (south line 59) with stylus S, energizing relay PR2 (south line 59). Normally open contact PR2–B (south line 63) closed, energizing relay PR2' (south line 63). A permissive circuit is established through a normally closed contact ER–B (south line 28), a normally open contact PR2–B (south line 63) and a normally open contact PR2' (C.I. line 227) to relay PAR (intersection C line 142).

The traffic director now passes the magnetic stylus S through the connecting intersection C.I. closing program switch PS2 (C.I.) and energizing relay PR2 (C.I.). Normally open contact PR2–B (C.I.) closes, energizing relay PR2' (C.I.). Normally open contact PR2'–C (C.I. line 227) closes, completing the previously described permissive circuit, energizing alarm relay PAR (intersection C line 142). It is to be remembered that normally open contact PR2'–C (south line 221) is inserted into the comparable connecting intersection arm.

Reference is now made to the sequence of events caused by energization of alarm relay PAR (intersection C line 142). Normally closed contact PAR-A (intersection C line 121) opens in the permissive circuits to the intersection arm BBRS relays, causing them to be de-energized. This, in turn, causes the aircraft traffic signals BB to turn red, signifying "stop" or "hold" command to the aircraft or vehicle. Normally open contact PAR-B (intersection C line 151) closes, energizing alarm flasher light AL (intersection C line 149). This flasher light remains energized until the traffic director erases one of the conflicting programs.

Whereas the invention has been described herein with respect to routing aircraft through an airport's taxiway and runway intersection network, it is to be appreciated that the invention has other applications. Thus, for example, the invention may be used for routing automobiles through a network of intersecting automobile roadways. Also, the invention may be used for routing fluids through a network of intersecting fluid flow paths. Still further, the invention may be used in a material handling system for routing material through a network of intersecting material flow paths. Also, the invention may be used for routing railroad trains through a network of railroad track intersections. The foregoing applications of the invention are but a few of many applications and are presented herein as examples only and not for purposes of limiting the scope of the appended claims.

Having thus described our invention, we claim:

1. Apparatus for programming flow routes for routing movable means through a flow path intersection network and comprising:
    a display panel having grooves defined in the face thereof graphically illustrating said flow path intersection network, said grooves having continuous nonconductive side walls;
    an operator's manually movable stylus for tracing a programmed route on said panel's illustrated network, said programmed route being representative of the desired route to be followed by said movable means through the actual network;
    a plurality of stylus actuated means associated with the panel's illustrated network; and
    control means responsive to actuations of said stylus actuated means for controlling energization of intersection routing means associated with said actual network to route said movable means through said actual network in accordance with the programmed route traced by said stylus.

2. Apparatus as set forth in claim 1 wherein said stylus actuated means includes a plurality of individually stylus actuated switches.

3. Apparatus as set forth in claim 2 wherein said switches are magnetically actuated switches and said stylus includes a magnetic field source for individually actuating said switches.

4. Apparatus as set forth in claim 1 whtrein said display panel includes stylus guide means for guiding tracing movement of said stylus.

5. Apparatus as set forth in claim 4 wherein said guide means defines said panel's illustrated network.

6. Apparatus for programming flow routes for routing movable means through a flow path intersection network and comprising:
    a display panel including stylus guide means graphically illustrating said flow path intersection network;
    said guide means is a groove defined in the face of said display panel;
    an operator's manually movable stylus for tracing a programmed route on said panel's illustrated network, said programmed route being representative of the desired route to be followed by said movable means through the actual network;
    a plurality of stylus actuated means associated with the panel's illustrated network and position on the opposite side of said display panel from the face thereof; and
    control means responsive to actuations of said stylus actuated means for controlling energization of intersection routing means associated with said actual network to route said movable means through said actual network in accordance with the programmed route traced by said stylus.

7. Apparatus as set forth in claim 1 wherein said display panel graphically illustrates at least one flow intersection and two intersection arms extending from said flow intersection; and, wherein at least one of said stylus actuated means is associated with each said arm.

8. Apparatus as set forth in claim 7 wherein a first of said stylus actuated means is located between said panel intersection and a second of said stylus actuated means, and said control means includes program means responsive to the sequence of actuation of said first and second stylus actuated means to develop output signals representative of the directions traced by said stylus.

9. Apparatus as set forth in claim 8 including a third stylus actuated means for each said arm and located from said panel intersection at a point beyond said first and second stylus actuated means, said control means including program erase circuit means responsive to actuation of said third stylus actuated means for de-energizing said program control means when said third stylus actuated means is actuated after a predetermined time interval after said first and second stylus actuated means have been actuated.

10. Apparatus as set forth in claim 7 including memory means for displaying said programmed route to said operator, said control means including circuit means for energizing said memory means in accordance with the programmed route traced by said stylus.

11. Apparatus as set forth in claim 10 wherein said memory means includes visual display lamps mounted on said display panel.

12. Apparatus as set forth in claim 9 wherein said visual display lamps are located on said panel at points representative of said actual intersection routing means.

13. Apparatus as set forth in claim 10 wherein each said lamp includes a tail portion and a directional head portion, said directional head portion having a directional configuration pointing toward said associated arm and representative, when energized, that said movable means is to enter said associated arm from said intersection.

14. Apparatus as set forth in claim 13 wherein said tail portion is located at a point spaced within said intersection from said head portion and representative, when energized, that said movable means is to enter said intersection from said associated arm.

15. Apparatus as set forth in claim 14 wherein said panel includes a layer of translucent material with said graphical network being illustrated on one side of said layer and said program memory lamps being mounted on the opposite side.

16. Apparatus as set forth in claim 7 including program alarm means for alerting said operator to an alarm condition upon entry of conflicting programmed routes by said stylus, said control means including alarm circuit means for energizing said program alarm means when said stylus actuated means have been actuated to program conflicting routes through said actual network.

17. Apparatus as set forth in claim 16 wherein said program alarm means includes an alarm lamp located at said panel intersection.

18. Apparatus as set forth in claim 17 wherein said alarm circuit means includes a flasher circuit for alternately energizing and de-energizing said alarm lamp.

19. Apparatus as set forth in claim 18 wherein said panel includes a layer of translucent material with said graphical network being illustrated on one side of said layer and said alarm lamp being mounted on the opposite side.

20. Apparatus as set forth in claim 7 including movable means location and direction indicating means on said panel for alerting said operator as to locations and directions of movement of said movable means in said actual network, said control means including movable means detectors associated with said actual network for energizing said indicating means.

21. Apparatus as set forth in claim 20 wherein said indicating means are located at said panel adjacent said panel intersection arms.

22. Apparatus as set forth in claim 21 wherein said indicating means includes first and second selectively energized lamp portions, said first portion having a directional configuration pointing toward said panel intersection representative that said movable means is present in said actual arm and heading into said actual intersection.

23. Apparatus as set forth in claim 22 wherein said second lamp portion has a directional configuration pointing away from said intersection toward a said panel arm representative that said movable means is present in said actual arm and heading away from said actual intersection.

24. Apparatus as set forth in claim 20 including intersection detecting indicating means on said panel for alerting said operator that said movable means is present in said actual intersection.

25. Apparatus as set forth in claim 7 in combination with traffic signal means at said actual intersection for displaying visual movement and directional command signals to vehicles at said actual intersection network.

26. Apparatus as set forth in claim 25 including at least one said traffic signal means for each said actual intersection arm.

27. Apparatus as set forth in claim 25 including means for detecting the presence of vehicles in each said actual intersection arm.

References Cited
UNITED STATES PATENTS 2,371,749   3/1945   Field _____ 340—23

ALVIN H. WARING, Primary Examiner

U.S. Cl. X.R.

340—22, 153, 282, 337